(12) United States Patent
Nakagawa et al.

(10) Patent No.: US 9,308,777 B2
(45) Date of Patent: Apr. 12, 2016

(54) BEARING DEVICE FOR A WHEEL

(71) Applicants: Tohru Nakagawa, Shizuoka (JP); Yuichi Asano, Shizuoka (JP); Masahiro Ozawa, Shizuoka (JP); Masayuki Kuroda, Hyogo (JP)

(72) Inventors: Tohru Nakagawa, Shizuoka (JP); Yuichi Asano, Shizuoka (JP); Masahiro Ozawa, Shizuoka (JP); Masayuki Kuroda, Hyogo (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/317,097

(22) Filed: Jun. 27, 2014

(65) Prior Publication Data

US 2014/0306511 A1    Oct. 16, 2014

Related U.S. Application Data

(63) Continuation of application No. 12/675,880, filed as application No. PCT/JP2008/066781 on Sep. 17, 2008, now Pat. No. 8,801,294.

(30) Foreign Application Priority Data

Sep. 18, 2007    (JP) ................................. 2007-240983
Sep. 25, 2007    (JP) ................................. 2007-247548
Oct. 22, 2007    (JP) ................................. 2007-274073

(51) Int. Cl.
*F16C 13/00*      (2006.01)
*B60B 27/00*      (2006.01)
(Continued)

(52) U.S. Cl.
CPC ............ *B60B 27/0078* (2013.01); *B21D 53/10* (2013.01); *B60B 27/0005* (2013.01);
(Continued)

(58) Field of Classification Search
CPC ............ B60B 27/0005; B60B 27/0026; B60B 27/0042; B60B 27/0084; B60B 27/0094; B60B 27/0078; B60B 27/001; B60B 27/06; B60B 27/065; F16C 19/184; F16C 19/185–19/187; F16C 35/0635; F16C 2326/02
See application file for complete search history.

(56) References Cited

U.S. PATENT DOCUMENTS 4,893,960 A    1/1990    Beier et al.
5,853,227 A    12/1998    Schmidt, III
(Continued)

FOREIGN PATENT DOCUMENTS

FR    2 795 021    12/2000
GB    2 199 390    7/1988
(Continued)

OTHER PUBLICATIONS

International Search Report issued Nov. 4, 2008 in International (PCT) Application No. PCT/JP2008/066781.
(Continued)

*Primary Examiner* — James Pilkington
(74) *Attorney, Agent, or Firm* — Wenderoth, Lind & Ponack, L.L.P.

(57) ABSTRACT

A bearing device for a wheel is capable of suppressing radial play and allowing firm and easy connection between a hub and an outer ring of a constant velocity universal joint. Axially extending projections are provided on a shaft portion of a joint outer ring, and the shaft portion is press-fitted into a hole of a hub. Through this press-fitting, recesses held in close fit-engagement with the projections are formed by the projections in an inner diameter surface of the hub, forming a recess/projection fit-engagement structure in which the projections and the recesses are held in close contact with each other over an entire fit-engagement region thereof. A press-fitting margin ($\Delta d$) of the projections with respect to the hub and a height (h) of the projections are set to the following range: $0.3 < \Delta d/2\ h < 0.86$.

12 Claims, 40 Drawing Sheets

(51) Int. Cl.
*F16D 1/072* (2006.01)
*F16D 1/108* (2006.01)
*F16C 35/063* (2006.01)
*F16C 19/18* (2006.01)
*B21D 53/10* (2006.01)
*F16D 1/10* (2006.01)

(52) U.S. Cl.
CPC ......... *B60B27/0026* (2013.01); *B60B 27/0042* (2013.01); *B60B 27/0084* (2013.01); *B60B 27/0094* (2013.01); *F16C 19/184* (2013.01); *F16C 19/186* (2013.01); *F16C 35/0635* (2013.01); *F16D 1/072* (2013.01); *F16D 1/108* (2013.01); *F16C 2326/02* (2013.01); *F16D 2001/103* (2013.01); *Y10T 29/49535* (2015.01)

(56) References Cited

U.S. PATENT DOCUMENTS

| | | | |
|---|---|---|---|
| 6,146,022 | A | 11/2000 | Sahashi et al. |
| 6,497,515 | B1 | 12/2002 | Sahashi et al. |
| 6,692,157 | B2* | 2/2004 | Sahashi et al. ............... 384/537 |
| 6,851,865 | B2* | 2/2005 | Nomura et al. ............... 384/544 |
| 2002/0006239 | A1 | 1/2002 | Toda et al. |
| 2002/0195291 | A1 | 12/2002 | Nonogaki |
| 2009/0069100 | A1 | 3/2009 | Umekida et al. |
| 2010/0021102 | A1 | 1/2010 | Fukumura et al. |
| 2010/0092122 | A1* | 4/2010 | Fukumura et al. ............ 384/544 |
| 2010/0195947 | A1 | 8/2010 | Nakagawa et al. |
| 2010/0215302 | A1 | 8/2010 | Torri et al. |
| 2011/0053696 | A1 | 3/2011 | Umekida et al. |

FOREIGN PATENT DOCUMENTS

| | | |
|---|---|---|
| JP | 63-184501 | 7/1988 |
| JP | 2-29262 | 8/1990 |
| JP | 06-312322 | 11/1994 |
| JP | 08-226426 | 9/1996 |
| JP | 11-226814 | 8/1999 |
| JP | 2001-150905 | 6/2001 |
| JP | 2002-205504 | 7/2002 |
| JP | 2003-4060 | 1/2003 |
| JP | 2003-065316 | 3/2003 |
| JP | 2003-329047 | 11/2003 |
| JP | 2004-011799 | 1/2004 |
| JP | 2004-090839 | 3/2004 |
| JP | 2004-330343 | 11/2004 |
| JP | 2004-336965 | 11/2004 |
| JP | 2004-340311 | 12/2004 |
| JP | 2005-81868 | 3/2005 |
| JP | 2005-193757 | 7/2005 |
| JP | 2006-9895 | 1/2006 |
| JP | 2006-010006 | 1/2006 |
| JP | 2007-055322 | 3/2007 |
| JP | 2007-263298 | 10/2007 |
| NL | 7412001 | 3/1975 |
| WO | 2006/095603 | 9/2006 |
| WO | 2007/018001 | 2/2007 |
| WO | 2007/072926 | 6/2007 |
| WO | 2008/078511 | 7/2008 |
| WO | 2008/114698 | 9/2008 |
| WO | 2008/149728 | 12/2008 |

OTHER PUBLICATIONS

International Preliminary Report on Patentabilty and Written Opinion of the International Searching Authority mailed Apr. 15, 2010 in International (PCT) Application No. PCT/JP2008/066781.
Chinese Office Action issued Jun. 1, 2011 in corresponding Chinese Patent Application No. 200880107585.X w/English translation.
Supplementary European Search Report issued Jun. 27, 2011 in corresponding European Patent Application No. 08832364.7.
Japanese Office Action issued Jul. 3, 2012 in corresponding Japanese Patent Application No. 2008-246548 with partial English translation.
Translation of JP 06-312322 obtained Mar. 14, 2013.
Japanese Office Action issued May 16, 2013 in corresponding Japanese Patent Application No. 2008-239432 with Parital English Translation.

* cited by examiner

FIG. 41

| θ1 | FORMABILITY |
|---|---|
| 31° | DETERIORATED |
| 46° | DETERIORATED |
| 53° | SATISFACTORY |
| 72° | SATISFACTORY |
| 90° | SATISFACTORY |
| 105° | SATISFACTORY |
| 112° | SPLINE CRACK |

FIG. 42

| Δd/2h | FORMABILITY |
|---|---|
| 0.28 | SATISFACTORY |
| 0.36 | SATISFACTORY |
| 0.43 | SATISFACTORY |
| 0.50 | SATISFACTORY |
| 0.64 | SATISFACTORY |
| 0.71 | SATISFACTORY |
| 0.86 | SATISFACTORY |
| 0.89 | DETERIORATED |
| 0.95 | DETERIORATED |

# BEARING DEVICE FOR A WHEEL

TECHNICAL FIELD

The present invention relates to a bearing device for a wheel for rotatably supporting a wheel with respect to the body of a vehicle such as an automobile.

BACKGROUND ART

Various types of wheel bearing devices are developed, including a first generation type in which double-row rolling bearings are used in combination, a second generation type in which a body mounting flange is provided integrally with an outer member, a third generation type in which one of the two inner raceway surfaces of a double-row rolling bearing is formed on the outer periphery of a hub, and a fourth generation type in which one of the two inner raceway surfaces of a double row rolling bearing is formed on the outer periphery of a hub and, at the same time, the other inner raceway surface is formed on the outer periphery of an outer joint member of a constant velocity universal joint.

For example, Patent Document 1 discloses the third generation type of a wheel bearing device. As illustrated in FIG. 40, the third generation type of the bearing device for a wheel is provided with a hub 152 having an outwardly extending flange 151, a constant velocity universal joint 154 having an outer joint member 153 to be fixed to the hub 152, and an outer member 155 arranged on the outer side of the hub 152.

The constant velocity universal joint 154 is provided with the outer joint member 153, an inner joint member 158 arranged within a mouth portion 157 of the outer joint member 153, a ball 159 arranged between the inner joint member 158 and the outer joint member 153, and a retainer 160 retaining the ball 159. Further, a female spline 161 is formed on the inner diameter surface of the center hole of the inner joint member 158, and a male spline formed at an end of a shaft (not shown) is inserted into this center hole. Through fit-engagement of the female spline 161 on the inner joint member 158 side and the male spline on the shaft side, the inner joint member 158 and the shaft are connected together so as to allow torque transmission.

Further, the hub 152 has a cylindrical portion 163 and the flange 151. A short-cylinder-like pilot portion 165 for attaching a wheel and a brake rotor (not shown) protrudes from an outer end surface 164 (out-board side end surface) of the flange 151. The pilot portion 165 includes a large diameter portion 165a and a small diameter portion 165b, and the wheel is fitted onto the large diameter portion 165a, and the brake rotor is fitted onto the small diameter portion 165b.

A fit-engagement portion 166 is provided on the outer peripheral surface of the in-board side end portion of the cylindrical portion 163, and an inner ring 167 is fit-engaged with the fit-engagement portion 166. A first inner raceway surface 168 is provided on the portion of the outer peripheral surface of the cylindrical portion 163 in the vicinity of the flange 151, and a second inner raceway surface 169 is provided on the outer peripheral surface of the inner ring 167. A bolt attachment hole 162 is provided in the flange 151 of the hub 152, and a hub bolt for fixing the wheel and the brake rotor to the flange 151 is attached to the bolt attachment hole 162.

The outer member 155 of the rolling bearing has in its inner periphery two outer raceway surfaces 170 and 171, and, in its outer periphery, a flange (vehicle body mounting flange) 182. The first outer raceway surface 170 of the outer member 155 and the first inner raceway surface 168 of the hub 152 are opposed to each other, and the second outer raceway surface 171 of the outer member 155 and the raceway surface 169 of the inner ring 167 are opposed to each other, with rolling elements 172 provided between the opposing surfaces.

A shaft portion 173 of the outer joint member 153 is inserted into the cylindrical portion 163 of the hub 152. A screw portion 174 is formed at a shaft end portion of the shaft portion 173, and a male spline 175 is formed on the outer peripheral portion on the in-board side of the screw portion 174. A female spline 176 is formed on the inner diameter surface of the cylindrical portion 163 of the hub 152. By forcing the shaft portion 173 into the cylindrical portion 163 of the hub 152, the male spline 175 on the shaft portion 173 side and the female spline 176 on the hub 152 side are fit-engaged with each other.

Further, a nut member 177 is screwed on the screw portion 174 of the shaft portion 173, and the hub 152 and the outer joint member 153 are fixed to each other. In this process, a bearing surface 178 of the nut member 177 and an outer end surface 179 of the cylindrical portion 163 abut each other, and an out-board side end surface 180 of the mouth portion 157 and an end surface 181 of the inner ring 167 abut each other. As a result, the hub 152 is held between the nut member 177 and the mouth portion 157 through the intermediation of the inner ring 167.

[Patent Document 1] JP 2004-340311 A

SUMMARY OF THE INVENTION

Problem to be Solved by the Invention

As described above, in the prior art, the outer joint member 153 and the hub 152 are connected together by forcing the male spline 175 provided on the shaft portion 173 into the female spline 176 provided on the hub 152. Thus, it is necessary to perform spline-machining on both the shaft portion 173 and the hub 152, resulting in a rather high cost. Further, at the time of forcing-in, it is necessary to affect projection/recess matching between the male spline 175 of the shaft portion 173 and the female spline 176 of the hub 152. If, in this process, the forcing-in is affected with tooth faces mating each other, there is a fear of the tooth surfaces being damaged by burrs or the like. When the forcing-in is affected through large-diameter matching, circumferential play is likely to be generated. Circumferential play leads to a rather poor torque transmission property, and a fear of generation of abnormal noise. In this way, in the case of spline fit-engagement, there are involved problems of damage of the tooth surfaces at the time of forcing-in and generation of play during use, and it is difficult to avoid both problems simultaneously.

Further, it is necessary for the nut member 177 to be screwed on the screw portion 174 of the shaft portion 173 protruding from the cylindrical portion 163. Thus, the assembly work involves screw fastening operation, resulting in a rather poor workability. Further, the number of components is large, resulting in a rather poor component controllability.

The present invention has been made in view of the above-mentioned problems. It is an object of the present invention to provide a bearing device for a wheel which can suppress generation of circumferential play, which provides superior workability for connection between the hub and the outer joint member of the constant velocity universal joint, and in which the hub and the outer joint member of the constant velocity universal joint are firmly connected together.

Means for Solving the Problems

A bearing device for a wheel according to the present invention includes: a bearing for a wheel provided with an outer member having double row raceway surfaces in an inner periphery thereof, an inner member having in an outer periphery thereof double row raceway surfaces opposed to the raceway surfaces and having in the outer periphery thereof a flange for mounting a wheel, and a plurality of rolling elements provided between the raceway surfaces of the outer member and the inner member; and a constant velocity universal joint having an outer joint member, with a shaft portion of the outer joint member being fitted into a hole of a hub being connected with the hub through fit-engagement of a recess and a projection, and is characterized in that an axially extending projection provided on one of the shaft portion of the outer joint member and the hole of the hub is press-fitted into another, and a recess is formed in the another by the projection, to thereby form a recess/projection fit-engagement structure in which the projection and the recess are held in close contact with each other over an entire fit-engagement region to integrate the hub and the outer joint member with each other, and in that a press-fitting margin $\Delta d$ of the projection with respect to a member in which the recess is to be formed and a height h of the projection are in the following relationship: $0.3 < \Delta d/2\ h < 0.86$.

In the bearing device for a wheel of the present invention, when the projection is press-fitted into the mating portion, the projection is engaged in the inner diameter surface of the hole of the hub, whereby the hole is slightly increased in diameter, and axial movement of the projection is allowed. When the axial movement is stopped, the hole is reduced in diameter to be restored to the original diameter. As a result, the portion of the projection fit-engaged with the recess (continuous region from the apex of the projection to the side surfaces on both sides thereof) is entirely brought into close contact with the recess, and no gap leading to generation of play is formed in either the radial direction or the circumferential direction. Thus, the entire fit-engaged portion contributes to torque transmission, making it possible to transmit torque in a stable manner. Further, no abnormal noise is generated. In addition, since the projection and the recess are held in close contact with each other without involving any gap, it is possible to achieve an improvement in the strength of the torque transmission portion. As a result, the bearing device for a wheel can be made lightweight and compact.

Further, owing to the range of $0.3 < \Delta d/2\ h < 0.86$, it is possible to secure a sufficient press-fit margin for the projection. When $\Delta d/2\ h$ is 0.3 or less, the torsional strength is low (see FIG. 39); when $\Delta d/2\ h$ exceeds 0.86, the entire projection is likely to be engaged in the mating portion in a part of the circumferential region due to slight decentering at the time of press-fitting or press-fit inclination. As a result, the formability of the recess/projection fit-engagement structure deteriorates (see FIG. 42), and the press-fitting load increases abruptly (see FIG. 38). When the formability of the recess/projection fit-engagement structure deteriorates, not only does the torsional strength decrease but also the expansion amount of the hub outer diameter increases, and hence the function of the bearing attached to the hub is affected, and there occurs a problem such as a reduction in rotation service life. In contrast, by setting $\Delta d/2\ h$ to the range of 0.3 to 0.86, the formability of the recess/projection fit-engagement structure is stabilized, and no variation in press-fit load is involved, thus making it possible to attain a stable torsional strength.

In this case, it is desirable to provide a corner portion devoid of roundness and capable of cutting into the mating member at the edge of the press-fitting start side end surface of the projection. With this construction, when the projection is press-fitted into the mating member, the corner portion devoid of roundness formed at the edge of the press-fitting start side end surface of the projection cuts into the mating other, and hence it is possible to prevent an increase in press-fit load. As the press-fitting proceeds, the projection cuts out or pushes out a part of the mating member, thereby forming a recess. As a result, it is possible to form the recess/projection fit-engagement structure with high precision. Further, there is no need to previously form a spline portion or the like on the member in which the recess is formed, and hence an improvement in productivity is achieved. Still further, since there is no need to effect phase matching between the splines, it is possible to achieve an improvement in assembly property. Yet further, it is possible to avoid damaging the tooth surfaces at the time of press-fitting, making it possible to maintain a stable fit-engagement state.

It is desirable for the above-mentioned corner portion devoid of roundness to be arranged at least in the region of the edge of the end surface of the projection to be fit-engaged with the recess. This makes it possible for the projection to be reliably press-fitted into the other (mating member), thereby preventing an increase in press-fitting load.

It is possible to provide a cutout portion at the apex portion of the end surface of the projection. By thus providing the cutout portion, it is possible to prevent damage such as chipping or deformation of the projection generated at the apex portion of the end surface on the press-fitting start side at the time of press-fitting, etc. Thus, the handling of the projection is facilitated, and there is no need to separately take any measure to protect the press-fitting start end of the projection, thereby reducing the control man-hours and achieving a reduction in cost. Further, in order to increase the hardness, even when quenching is performed on the projection, it is possible to prevent generation of quenching crack. The cutout portion may be formed by curved R-beveling or tapered C-beveling.

When the cutout portion is provided, it is desirable for the radial length "a" of the cutout portion to be set to the range: $0 < a < \Delta d/2\ h$, where $\Delta d$ is the press-fitting margin of the projection with respect to the member where the recess is to be formed. This makes it possible to arrange a corner portion devoid of roundness at the portion of the edge of the end surface of the projection, where the recess is to be formed, making it possible to secure the action of cutting into the mating member by this corner portion. In particular, by setting the radial length "a" of the cutout portion to 0.3 mm or less, it is possible to perform press-fitting more reliably with the corner portion devoid of roundness.

In the section of the projection in the press-fitting direction, assuming that the angle (crossing angle) made by the end surface of the projection on the press-fitting start side and the axis is $\theta1$, it is desirable for the angle to be set to the range: $50° \leq 110°$. This helps to reduce the falling of the corner portion devoid of roundness with respect to a plane orthogonal to the press-fitting direction, and hence stable press-fitting is possible. As a result, a high precision recess/projection fit-engagement structure can be formed in a stable manner. When the crossing angle $\theta1$ is less than 50°, the press-fit load increases (see FIG. 37), and the formability of the recess/projection fit-engagement structure deteriorates (see FIG. 41). Conversely, when the crossing angle $\theta1$ exceeds 110°, inclination occurs excessively in the press-fitting direction with respect to the orthogonal plane, and hence there is a fear of the projection being chipped at the time of handling or press-fitting. In order to secure a more stable formability for the recess/projection fit-engagement structure, it is desirable to set the crossing angle $\theta1$ to the range of not less than 70° and less than 110°.

Further, in a pitch circle of the projection, it is desirable for an angle θ2 made by a radial line and a side surface of the projection to satisfy the following relationship: 0°<θ2<45°, and when the pitch circle diameter of the projection is PCD, the number of projections is Z, and P=PCD/Z, it is desirable for P to satisfy the following relationship: 0.30<P<1.0.

With this construction, it is possible to reduce the increase in the diameter of the hub after the press-fitting, thereby achieving an improvement in press-fitting property. This is due, for example, to the following: by press-fitting the projection, the diameter of the hole of the hub increases; however, when the angle θ2 is too large, the diameter enlarging force is easily exerted at the time of press-fitting, and hence the increase amount of the outer diameter of the hub at the time of completion of the press-fitting increases, resulting an increase in the tensile stress (hoop stress) of the outer diameter portion of the hub and the outer diameter portion of the inner ring; further, at the time of torque transmission, the radial component of force increases, and hence the outer diameter of the hub increases, resulting in an increase in the tensile stress (hoop stress) of the outer diameter portion of the hub and the outer diameter portion of the inner ring. An increase in the tensile stress (hoop stress) leads to a reduction in the service life of the bearing.

When the above-mentioned P is too small, the application range of the press-fitting margin of the projection with respect to the member in which the recess is to be formed is very small, and the dimensional tolerance is also small, and hence the press-fitting is difficult to perform. Further, the centering of the hole of the hub and the shaft portion of the outer joint member is difficult to perform. Inclination at the time of press-fitting, even if small, may cause the entire region of the press-fitted projection to be engaged in the mating member. When P is 1.0 or more, the machining volume (removal volume) for one projection 1 increases, and hence the recess formability due to the projection deteriorates, and the press-fit load increases.

In particular, owing to the ranges of 20°<θ2<35°, and 0.33<P<0.7, even if a special steel and surface treatment are not adopted for the material of the projection, or even if it is not formed in a sharp shape, it is possible to form the recess by the projection at the time of press-fitting by using a generally adopted steel for machine structures, making it possible to minimize the increase in the outer diameter of the hub after the press-fitting. Further, by setting θ2 to 20° or more, it is possible to form the projection by rolling when the projection is provided on the stem side.

The inner member includes, for example, a hub having in the outer periphery a flange for mounting the wheel, and an inner ring press-fitted into the outer periphery of the in-board side end portion of the hub. In this case, it is possible to form the raceway surface in the outer periphery of the hub and in the outer periphery of the inner ring. As a result, it is possible to achieve a reduction in the weight and size of the bearing device for a wheel.

When the projection is provided on the shaft portion of the outer joint member, it is desirable for the hardness of an end region including at least the end surface of the projection to be higher than that of the hole inner peripheral portion of the hub. As a result, it is possible to improve the strength of the shaft portion. Further, the property of the shaft portion is increased, with which the inner peripheral portion of the hub is more deeply cut into.

For the same reason, in the case in which the projection is provided on the inner diameter surface of the hole of the hub, it is desirable for the hardness of the end portion region including at least the end surface of the projection to be higher than that of the outer peripheral portion of the shaft portion of the outer joint member. In this case, there is no need to perform thermal hardening processing on the shaft portion side, and hence it is possible to achieve superior productivity for the outer joint member.

When the projection is provided at a plurality of circumferential positions, it is desirable that, in the middle portion in the height direction of the projection, the peripheral height of the projection be smaller than the width of the groove between the adjacent projections. In this case, the wall portion of the mating member entering the groove between the adjacent projections has a large thickness in the circumferential direction. As a result, the shear plane area of the wall portion can be enlarged, making it possible to achieve an improvement in terms of torsional strength. Further, since the tooth thickness of the projection is small, the press-fit load can be made small, making it possible to achieve an improvement in terms of press-fitting property. The same effect can also be attained when, in the middle portions in the height directions of the projections, the sum total of the circumferential thicknesses of the projections is smaller than the sum total of the widths of the grooves between the adjacent projections.

It is possible to provide, between the shaft portion of the outer joint member and the inner diameter surface of the hub, a detachment prevention structure suppressing detachment of the shaft portion. By providing the detachment prevention structure, it is possible to prevent axial detachment of the outer joint member with respect to the hub, making it possible to maintain a stable connection state.

It is possible to allow separation of the recess/projection fit-engagement structure through imparting of an axial drawing force, and the hub and the shaft portion of the outer joint member are fixed together through an intermediation of a bolt member. In this case, when the bolt fixation is canceled, and an axial draw-out force is imparted to the shaft portion of the outer joint member, it is possible to remove the outer joint member from the hole of the hub. As a result, it is possible to achieve an improvement in terms of workability in the repair/inspection of the components (maintainability). Further, through the bolt fixation, axial detachment of the outer joint member from the hub is suppressed, making it possible to perform stable torque transmission for along period of time.

In the state in which the hub and the shaft portion of the outer joint member are fixed together by the bolt member, an inner wall constituting the bearing surface of the head portion of the bolt member is provided in the hole of the hub, whereby the bolt fixation is stabilized.

By providing a seal member between the bearing surface of the bolt member and the inner wall, it is possible to prevent intrusion of rainwater and foreign matter into the recess/projection fit-engagement structure from the bolt member, thereby achieving an improvement in quality.

In the shaft portion of the outer joint member or the hole of the hub, it is possible to provide a pocket portion for accommodating a protruding portion generated as a result of the formation of the recess by the press-fitting. In this case, the protruding portion is the material in an amount corresponding to the volume of the recess formed by the projection; it is pushed out of the recess formed, cut so as to form the recess, or both pushed out and cut. By providing the pocket portion, it is possible to retain the protruding portion in the pocket portion, and there is no fear of the protruding portion sticking out of the device to enter the interior of the vehicle. In this case, the protruding portion may remain accommodated in the pocket portion, and there is no need to perform the processing to remove the protruding portion, thus achieving a reduction in assembly man-hours, an improvement in assembly workability, and a reduction in cost.

Further, when a flange portion for alignment between the shaft portion and the hub is provided on the portion of the shaft portion on the shaft end side of the pocket portion, there is no fear of the protruding portion accommodated in the pocket portion sticking out to the flange portion side, and the accommodation of the protruding portion becomes more stable. Further, it is possible to use the flange portion for alignment, making it possible to press-fit the shaft portion reliably into the hub while preventing decentering. Thus, it is possible to connect the outer joint member and the hub with high precision, making it possible to effect torque transmission in a stable manner.

Effects of the Invention

According to the present invention, it is possible to suppress generation of play during use of the bearing device for a wheel. Further, it is possible to attain superior workability for the connection between the hub and the outer joint member. Still further, the fit-engagement between the hub and the constant velocity universal joint is stable, making it possible to provide a bearing device for a wheel superior also in terms of strength.

BRIEF DESCRIPTION OF THE DRAWINGS

FIG. 41 is a table illustrating formability evaluation results for the recess/projection fit-engagement structure when the crossing angle θ1 is varied.

FIG. 42 is a table illustrating formability evaluation results for the recess/projection fit-engagement structure when Δd/2 h is varied.

DETAILED DESCRIPTION OF THE INVENTION

Figure 1:
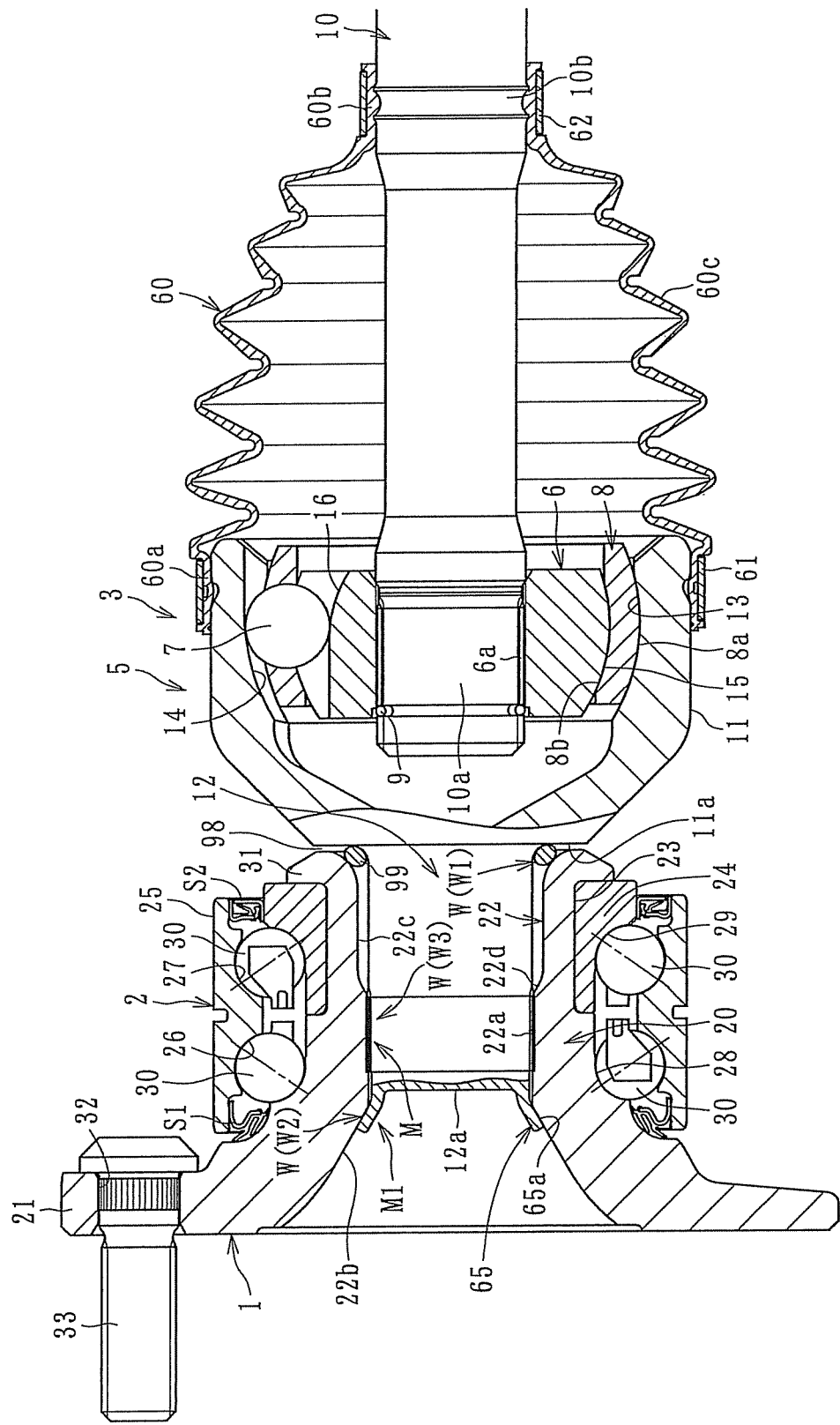
FIG. 1 is a sectional view of a bearing device for a wheel according to an embodiment of the present invention.

In the following, embodiments of the present invention are described with reference to FIGS. 1 through 43. FIG. 1 illustrates a bearing device for a wheel according to a first embodiment of the present invention. In this bearing device for a wheel, a double-row wheel bearing 2 including a hub 1 and a constant velocity universal joint 3 are integrated with each other. In the following description, the term "in-board side" refers to the side constituting the inner side with respect to the vehicle width direction when the bearing device is mounted to a vehicle, and the term "out-board side" refers to the side constituting the outer side with respect to the vehicle width direction when the bearing device is mounted to a vehicle.

The constant velocity universal joint mainly includes a joint outer ring 5 as an outer joint member, a joint inner ring 6 as an inner joint member arranged on the inner side of the joint outer ring 5, a plurality of balls 7 provided between the joint outer ring 5 and the joint inner ring 6 to transmit torque, and a cage 8 provided between the joint outer ring 5 and the joint inner ring 6 and adapted to retain the balls 7. An end portion 10a of a shaft 10 is press-fitted into an inner periphery of a hole of the joint inner ring 6 to effect spline fit-engagement, whereby connection with the shaft 10 is effected so as to allow torque transmission. A snap ring 9 for preventing shaft detachment is fit-engaged with the end portion 10a of the shaft 10.

The joint outer ring 5 includes a mouth portion 11 and a shaft portion (also referred to as stem portion) 12, and the mouth portion 11 is formed in a cup-like shape open at its one end. In an inner spherical surface 13 thereof, there are formed a plurality of axially extending track grooves 14 at equal circumferential intervals. The track grooves 14 extend to the opening end of the mouth portion 11. The joint inner ring 6 has in an outer spherical surface 15 thereof a plurality of axially extending track grooves 16 formed at equal circumferential intervals.

The track grooves 14 of the joint outer ring 5 and the track grooves 16 of the joint inner ring 6 are paired with each other, and one ball 7 as a torque transmission element is incorporated into a ball track formed by each pair of track grooves 14, 16 so as to be capable of rolling. The balls 7 are provided between the track grooves 14 of the joint outer ring 5 and the track grooves 16 of the joint inner ring 6 to transmit torque. The cage 8 is slidably provided between the joint outer ring 5 and the joint inner ring 6, with an outer spherical surface 8a thereof being fit-engaged with the inner spherical surface 13 of the joint outer ring 5 and an inner spherical surface 8b thereof being fit-engaged with the outer spherical surface 15 of the joint inner ring 6. While in this example the constant velocity universal joint 3 is of the undercut free type, in which the outer ring track grooves 14 are linear on the opening side of the mouth portion 11 and in which the joint inner ring track grooves 16 are straight on the deep side of the mouth portion 11, it is also possible to adopt a constant velocity universal joint of some other type such as the zepper type.

The opening of the mouth portion 11 is stopped by a boot 60. The boot 60 includes a large diameter portion 60a, a small diameter portion 60b, and a bellows portion 60c connecting the large diameter portion 60a and the small diameter portion 60b. The large diameter portion 60a is fitted onto the opening of the mouth portion 11, and is fastened in this state by a boot band 61. Further, the small diameter portion 60b is fitted onto a boot attachment portion 10b of the shaft 10, and is fastened in this state by a boot band 62.

The hub 1 includes a cylindrical portion 20, and a wheel mounting flange 21 provided at the out-board side end portion of the cylindrical portion 20. A hole 22 of the cylindrical portion 20 includes a shaft portion fit-engagement hole 22a in the middle portion in the axial direction, a tapered hole 22b on the out-board side, and a large diameter hole 22c on the in-board side. At the shaft portion fit-engagement hole 22a, the shaft portion 12 of the joint outer hole 5 and the hub 1 are connected via a recess/projection fit-engagement structure M described below. Between the shaft portion fit-engagement hole 22a and the large diameter hole 22c, there is provided a tapered portion (tapered hole) 22d. The tapered portion 22d is reduced in diameter toward the shaft end of the shaft portion 12 of the joint outer ring 5. The taper angle θ3 of the tapered portion 22d (see FIG. 4A) ranges, for example, from 15° to 75°.

A small diameter step portion 23 is formed on the in-board side outer peripheral surface of the hub 1. By fit-engaging the step portion 23 with an inner ring 24, there is formed an inner member having double row inner raceway surfaces (inner races) 28 and 29. Of the double row inner raceway surfaces, the out-board side inner raceway surface 28 is formed on the outer peripheral surface of the hub 1, and the in-board side inner raceway surface 29 is formed on the outer peripheral surface of the inner ring 24. The wheel bearing 2 is formed of this inner member, an outer member 25 arranged on the outer side of the inner member and having in its inner periphery double row outer raceway surfaces (outer races) 26 and 27, and balls as rolling elements 30 arranged between the out-board side outer raceway surface 26 of the outer member 25 and the inner raceway surface 28 of the hub 1 and between the in-board side outer raceway surface 27 of the outer member 25 and the inner raceway surface 29 of the inner ring 24. The inner member having the inner raceway surfaces 28 and 29 is formed of the hub 1 and the inner ring 24 press-fitted into the outer periphery of the hub 1, and hence it is possible to achieve a reduction in the weight and size of the bearing device for a wheel. Note that seal members S1 and S2 are attached to both openings of the outer member 25.

In the wheel bearing 2, the in-board side cylindrical end portion of the hub 1 is plastically deformed by orbital forming, and the inner ring 24 is pressed by a orbital-formed portion 31 formed by orbital forming, whereby a pre-load is imparted to the interior of the bearing. As a result, the inner ring 24 can be fixed to the hub 1. In the case in which a pre-load is imparted to the bearing 2 by the orbital-formed portion 31 formed at the end of the hub 1, there is no need to impart a pre-load by the mouth portion 11 of the joint outer ring 5. Thus, it is possible to press-fit the shaft portion 12 of the joint outer ring 5 without taking the pre-load amount into consideration, thereby achieving an improvement in terms of the connection property (assembly property) between the hub 1 and the joint outer ring 5. In this case, it is possible to keep the mouth portion 11 out of contact with the end portion of the hub 1 (which is the orbital-formed portion 31 in this embodiment). In correspondence with this, there is provided a gap 98 between the orbital-formed portion 31 of the hub 1 and a back surface 11a of the mouth portion 11. By keeping the mouth portion 11 and the hub 1 out of contact with each other, it is possible to prevent generation of abnormal noise due to contact between the mouth portion 11 and the hub 1.

Figure 43:
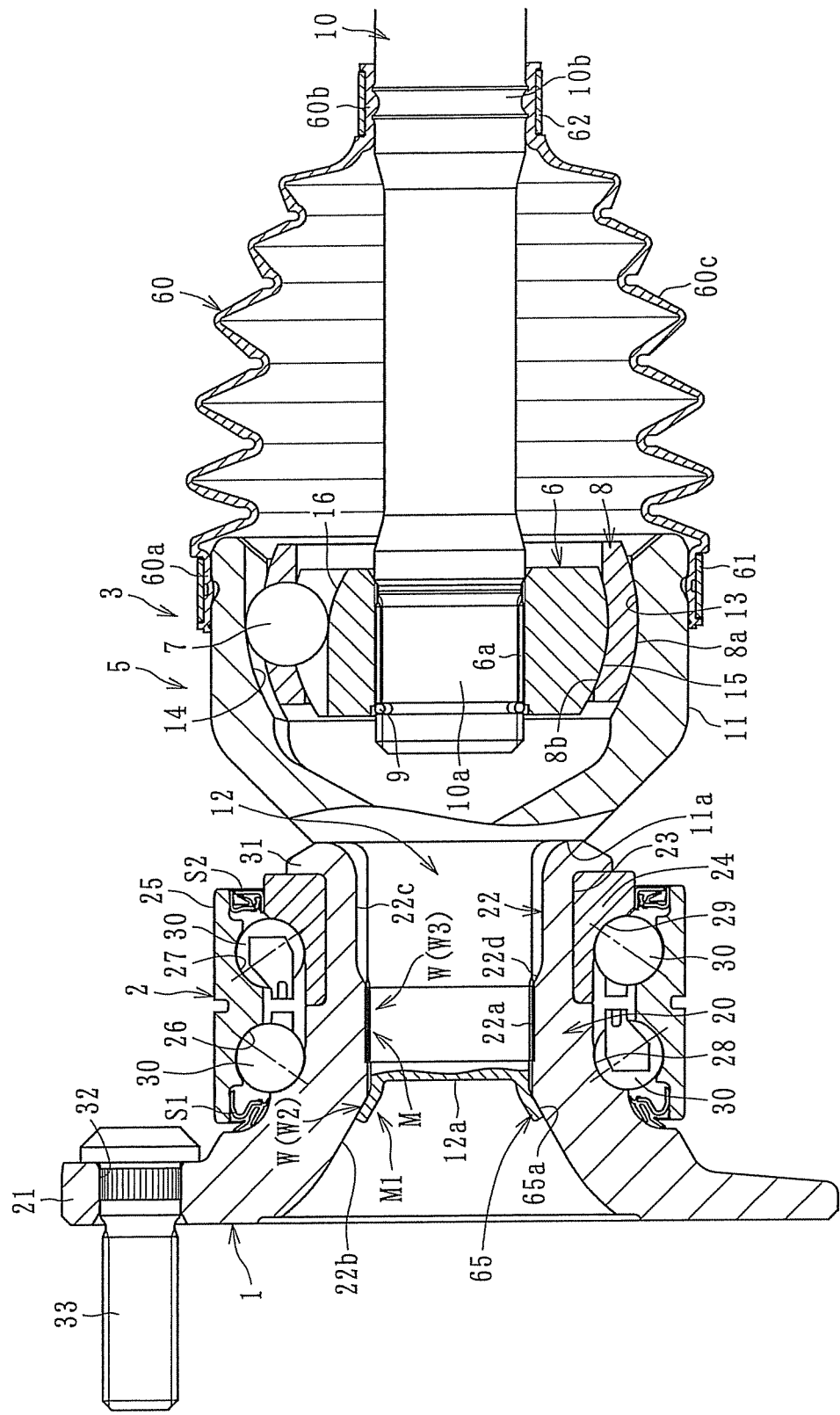
FIG. 43 is a sectional view of a bearing device for a wheel according to another embodiment.

As illustrated in FIG. 43, it is also possible to keep the orbital-formed portion 31 of the hub 1 and the back surface 11a of the mouth portion 11 in contact with each other. In this case, positioning is effected on the shaft portion 12 of the joint outer ring 5, and hence it is possible to achieve a stable dimensional precision for the wheel bearing device, and the axial length of the recess/projection fit-engagement structure M is stabilized, thereby achieving an improvement in terms of torque transmission property. When the orbital-formed portion 31 of the hub 1 and the back surface 11a of the mouth portion 11 are thus kept in contact with each other, it is desirable for the contact surface pressure between the orbital-formed portion 31 of the hub 1 and the back surface 11a of the mouth portion 11 to be 100 MPa or less. When the contact surface pressure exceeds 100 MPa, a difference in torsion amount is generated between the joint outer ring 5 and the hub 1 under a large torque load, and, due to this difference, there is a fear of abrupt slippage being generated at the contact portion to generate abnormal noise. Thus, by setting the contact surface pressure to 100 MPa or less, generation of abnormal noise is prevented, making it possible to provide a calm bearing device for a wheel.

The flange 21 of the hub 1 is provided with a bolt attachment hole 32, and a hub bolt 33 for fixing a wheel and a brake rotor to the flange 21 is attached to the bolt attachment hole 32. The hub 1 is not provided with the pilot portion 165, which is provided in the hub of the conventional wheel bearing device (see FIG. 40).

Figure 2A:
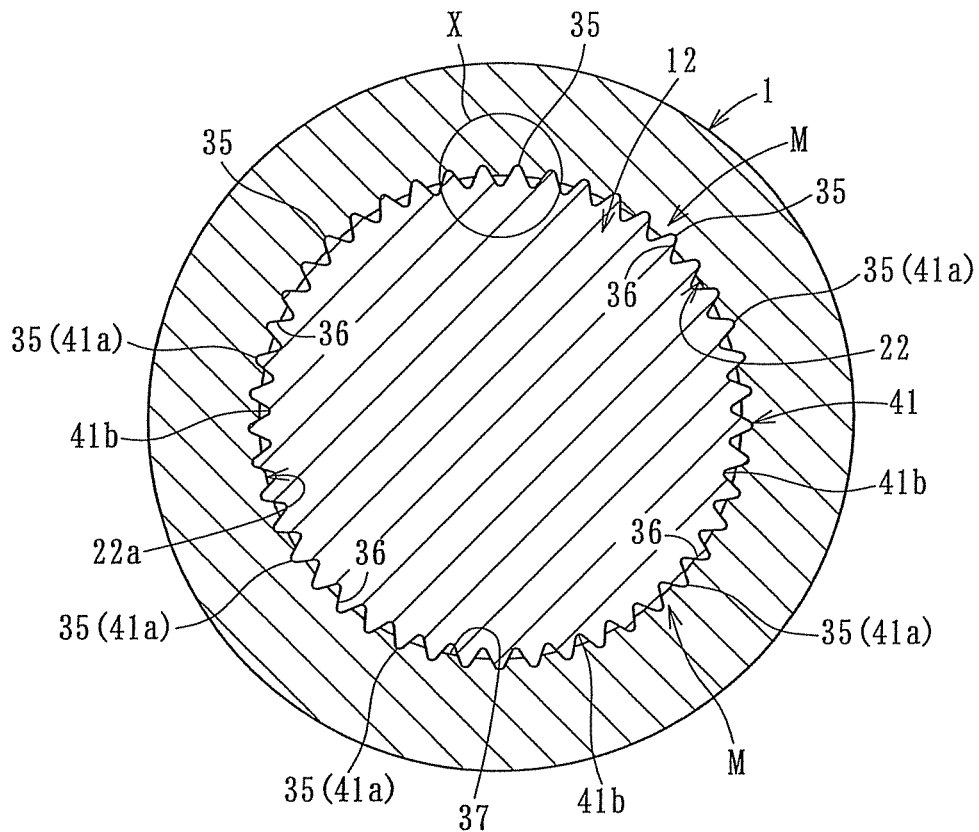
FIG. 2A is an enlarged sectional view of a recess/projection fit-engagement structure of the bearing device for a wheel.
Figure 2B:
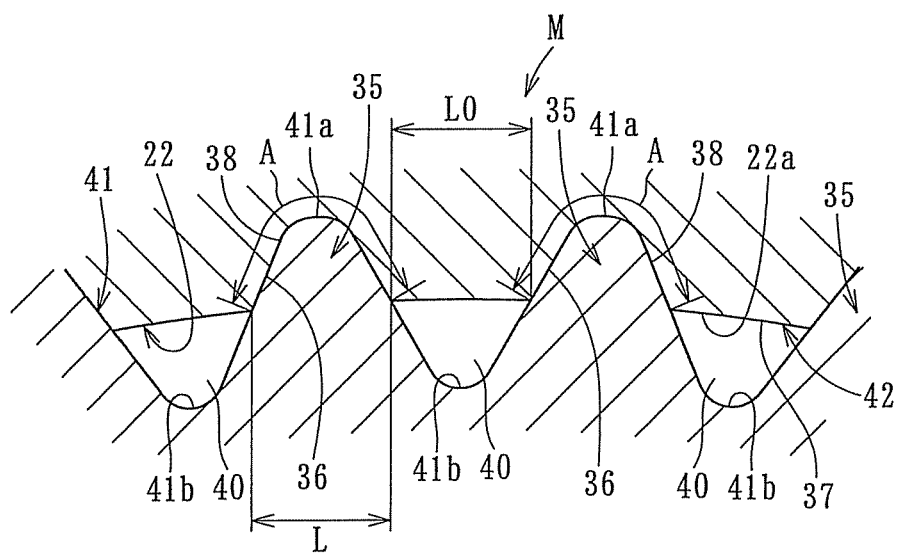
FIG. 2B is an enlarged view of portion X of FIG. 2A.

As illustrated in FIGS. 2A and 2B, the recess/projection fit-engagement structure M is formed, for example, of axially extending projections 35 provided on the out-board side end portion of the shaft portion 12, and recesses 36 formed in the inner diameter surface of the hole 2 of the hub 1 (the inner diameter surface 37 of a shaft portion fit-engagement hole 22a in this embodiment). The entire regions of the fit-engagement portions 38 of the projections 35 and the recesses 36 of the hub 1 fit-engaged with the projections 35 are held in close contact. A plurality of axially extending projections 35 are arranged at a predetermined circumferential pitch on the outer peripheral surface of the out-board side end portion of the shaft portion 12, and a plurality of recesses 36 to be fit-engaged with the projections 35 are formed circumferentially in the inner diameter surface 37 of the shaft portion fit-engagement hole 22a of the hole 22 of the hub 1. The projections 35 and the recesses 36 are tightly fit-engaged with each other over the entire periphery.

Figure 3A:
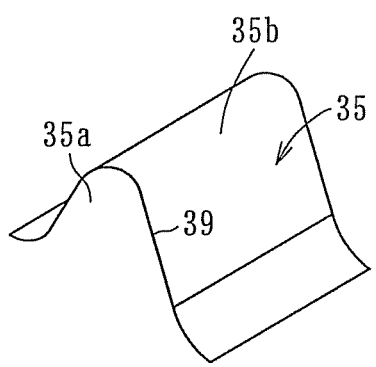
FIG. 3A is a perspective view of a projection of the recess/projection fit-engagement structure.

In this case, as illustrated in FIG. 3A, each projection 35 has a triangular (chevron-shaped) sectional shape with a rounded apex, and each projection 35 is fit-engaged with each recess in a range A as indicated by FIG. 2A. Each projection 35 and each recess 36 are fit-engaged with each other in a sectional range from the middle portions on both circumferential side of the protrusion 35 to the apex. Clearances 40 are formed between the circumferentially adjacent projections 35 and on the inner side of the inner diameter surface 37 of the hub 1.

Each projection 35 has a corner portion 39 devoid of roundness at the edge of the press-fitting start side end surface 35a. Herein, the term "corner portion 39" means a chevron-shaped ridge (a side defined through intersection of two adjacent surfaces of a polyhedron) formed by linearly crossing of the end surface 35a and the peripheral surface 35b of the projection 35. Thus, one formed by C-beveling the corner portion is excluded. However, even when C-beveling is not to be observed to the naked eye, there are cases where C-beveling is to be observed microscopically. Similarly, while the corner portion is "devoid of roundness", there are cases where, if not to be confirmed to the naked eye, R-beveling is to be observed microscopically. In view of this, in the present invention, a corner portion with R-beveling of 0.1 mm or less or one with a corner portion with C-beveling of 0.1 mm or less is to be regarded as a "corner portion devoid of roundness." For example, when a male spline 41 of a module of 0.48 having 58 teeth is formed, a corner portion with R-beveling of an R of approximately 0.02 to 0.05 mm or a corner portion with C-beveling of a C of approximately 0.02 to 0.05 mm is to be regarded as a "corner portion devoid of roundness." In this case, the module is obtained by dividing the pitch circle diameter by the number of teeth.

Figure 3B:
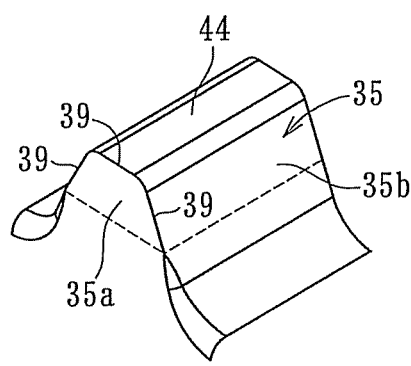
FIG. 3B is a perspective view of another example of the projection of the recess/projection fit-engagement structure.

As illustrated in FIG. 3B, it is also possible for the projection 35 to be one having a flat surface 44 at its apex.

As illustrated in FIG. 1, a detachment prevention structure M1 for suppressing detachment of the shaft portion is provided between the end portion of the shaft portion 12 of the joint outer ring 5 and the inner diameter surface 37 of the hub 1. The detachment prevention structure M1 is formed of a tapered locking member 65 extending from the end portion of the shaft portion 12 of the joint outer ring 5 toward the out-board side and axially engaged with the tapered hole 22b. The tapered locking member 65 includes a ring-like member diverging from the in-board side to the out-board side, and at least apart of an outer peripheral surface 65a thereof is held in press contact or contact with the tapered hole 22b.

In this bearing device for a wheel, means W for preventing intrusion of foreign matter into the recess/projection fit-engagement structure M are provided on the in-board side and the out-board side of the recess/projection fit-engagement structure M.

Figure 8A:
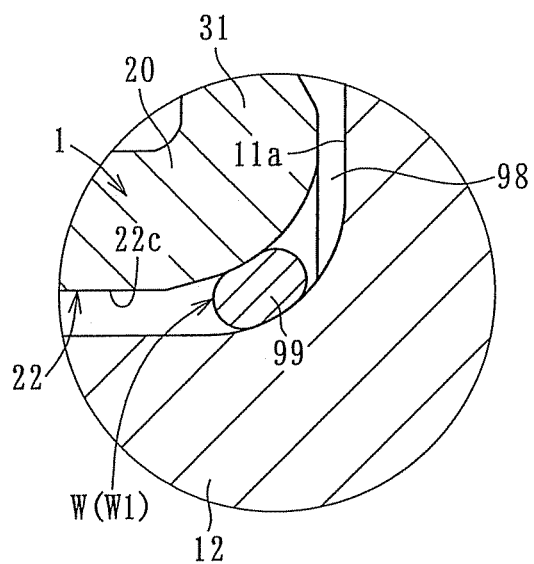
FIG. 8A is an enlarged sectional view of a construction using an O-ring as a seal member.
Figure 8B:
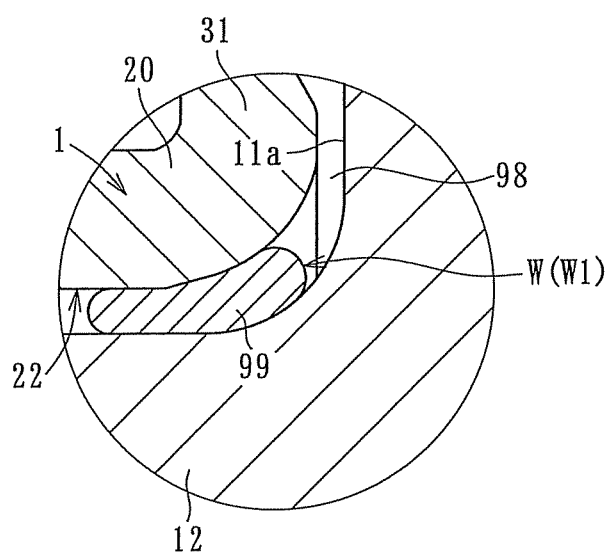
FIG. 8B is an enlarged sectional view of a construction using a gasket as a seal member.

As illustrated in FIGS. 8A and 8B, on the in-board side, a seal member 99 is fitted in a gap 98 between the orbital-formed portion 31 of the hub 1 and the back surface 11a of the mouth portion 11, and the seal member 99 constitutes the in-board side foreign matter intrusion prevention means W1. The gap 98 is formed to extend from the portion between the orbital-formed portion 31 of the hub 1 and the back surface 11a of the mouth portion 11 to the portion between the large diameter hole 22c of the hub 1 and the shaft portion 12. In this way, the seal member 99 is arranged at the corner portion of the gap 98, that is, at the boundary portion between the orbital-formed portion 31 of the hub 1 and the large diameter portion 12c to stop the gap 98 between the end portion of the hub 1 and the bottom portion of the mouth portion 11, thereby preventing intrusion of rainwater, foreign matter or the like into the recess/projection fit-engagement structure M from the gap 98. As the seal member 99, it is possible to adopt, for example, a commercially available O-ring or the like as illustrated in FIG. 8A. The seal member 99 may be an arbitrary one as long as it can be provided between the end portion of the hub 1 and the bottom portion of the mouth portion 11. Apart from an O-ring, it is also possible to use a gasket or the like as illustrated in FIG. 8B, for example.

The out-board side foreign matter intrusion prevention means W2 can be formed of a seal member (not shown) provided between the tapered locking member 65 constituting an engagement portion and the inner diameter surface of the tapered hole 22b. In this case, a seal material is applied to the tapered locking member 65. That is, there is applied to the tapered locking member 65 a seal material selected from among various resins curable after the application and capable of exerting sealing property between the tapered locking member 65 and the inner diameter surface of the tapered hole 22b. Note that, as this seal material, there is selected one that does not deteriorate in the atmosphere in which this bearing device for wheel is used.

It is also possible to provide a seal material between the projections 35 and the recesses 36, thereby forming a foreign matter intrusion prevention means W (W3). In this case, there is applied to the surfaces of the projections 35 a seal material selected from among various resins curable after the application and capable of exerting sealing property in the fit-engagement contact portion 38.

The above-mentioned recess/projection fit-engagement structure M can be obtained by the following procedures.

First, a male spline 41 having a large number of axially extending teeth is formed on the shaft portion 12 of the joint outer ring 5 by a well-known machining method (rolling, cutting, press working, drawing, etc.). Of the male spline 41, the regions surrounded by the circle passing the tooth bottoms 41b, the tooth tips 41a, and the side surfaces connected to the tooth tips 41a constitute the projections 35.

It is desirable for the teeth of the male spline 41 to be of a module of 0.5 or less, which is smaller than the module of usually adopted splines. This makes it possible to achieve an improvement in terms of formability for the spline 41, and to reduce the press-fit load involved when the male spline 41 is press-fitted into the shaft portion fit-engagement hole 22a of the hub 1. By forming the projections 35 of the shaft portion 12 by the male spline 41, it is possible to utilize machining equipment for forming a spline on a shaft of this type, making it possible to form the projections 35 at low cost.

Figure 4A:
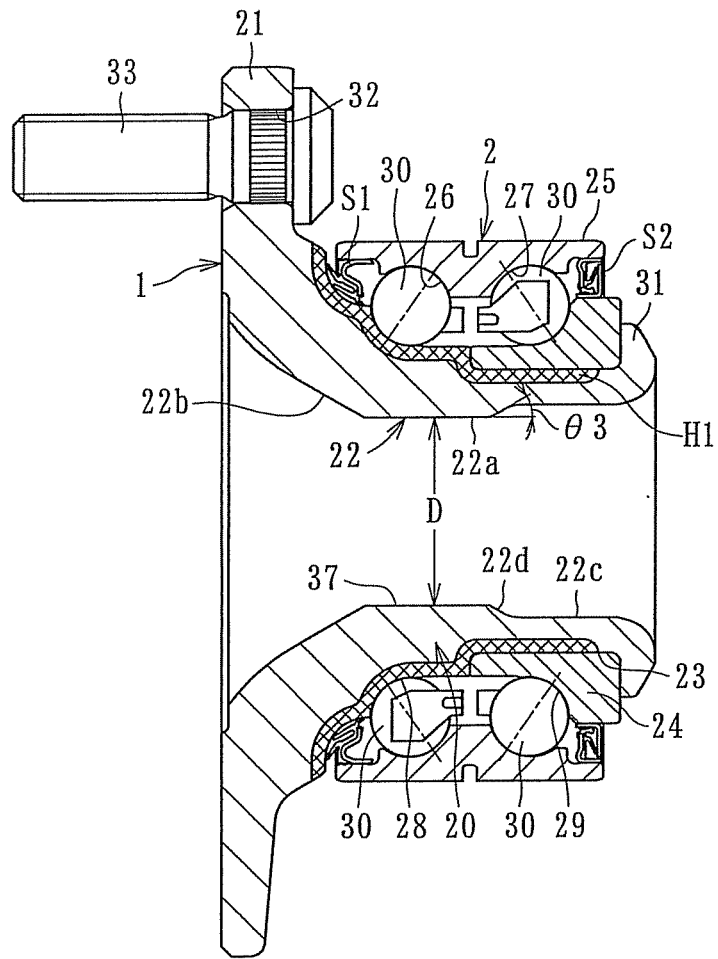
FIG. 4A is a sectional view of a bearing and a hub prior to the assembly of the bearing device for a wheel.
Figure 4B:
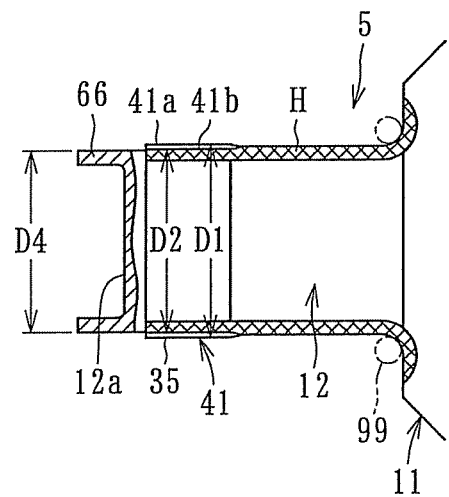
FIG. 4B is a sectional view of a joint outer ring prior to the assembly of the bearing device for a wheel.

Next, as indicated by cross-hatching in FIG. 4B, thermal hardening is affected on the outer peripheral surface of the shaft portion 12 to form a hardened layer H. The hardened layer H is formed continuously in the circumferential direction, including the whole projections 35 and the tooth bottoms 41b. The axial formation range for the hardened layer H is a range including at least the region from the out-board side end edge of the male spline 41 to the inner peripheral portion of the bottom wall of the mouth portion 11 of the joint outer ring 5. As the thermal hardening processing, it is possible to adopt various thermal processings such as induction hardening or carburizing and quenching. In this case, induction hardening is a quenching method applying a principle in which a portion requiring quenching is put in a coil through which high-frequency current is flowing to generate Joule heat through electromagnetic induction to thereby heat a conductive object. Carburizing and quenching is a method in which carbon is infiltrated/diffused from the surface of a low-carbon material before performing quenching.

On the other hand, the inner peripheral side of the hub 1 is maintained in an unquenched state. That is, the inner diameter surface 37 of the hole 22 of the hub 1 is formed as an unhardened portion (which is in an unquenched state) with no thermal hardening processing effected thereon. The difference in hardness between the hardened layer H of the shaft portion 12 of the joint outer ring 5 and the unhardened portion of the hub 1 is 20 points or more in HRC. For example, the hardness of the hardened layer H is approximately 50 HRC to 65 HRC, and the hardness of the unhardened portion is approximately 10 HRC to 30 HRC. Of the inner diameter surface 37 of the hub 1, it is only necessary for at least the inner diameter surface 37 of the shaft portion fit-engagement hole 22a to be an unhardened portion, and the rest of the inner diameter surface may undergo thermal hardening. If the above-mentioned difference in hardness is secured, it is possible to affect thermal hardening processing on the above-mentioned region to be formed as an "unhardened portion."

Figure 7:
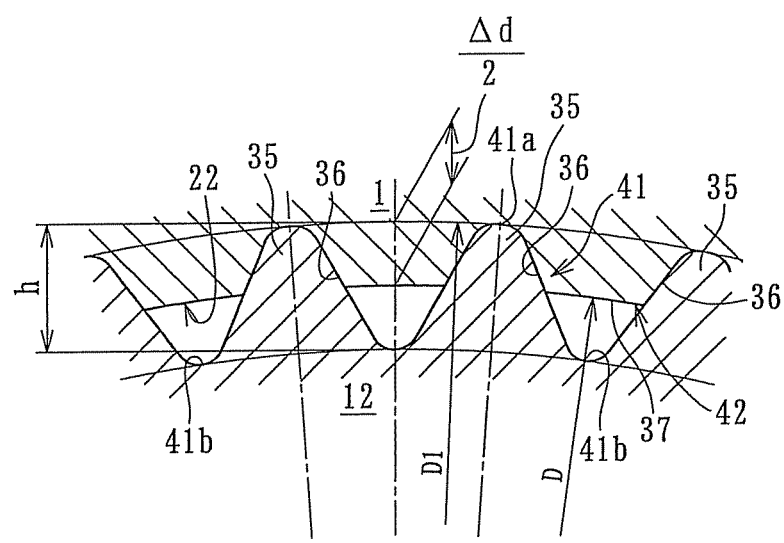
FIG. 7 is an enlarged sectional view of a recess/projection fit-engagement structure of the bearing device for a wheel.

In this regard, the middle portions in the height direction of the projections 35 are made to correspond to the position of the inner diameter surface 37 of the shaft portion fit-engagement hole 22 of the hub 1 prior to the formation of the recess. That is, as illustrated in FIG. 7, the inner diameter dimension D of the inner diameter surface 37 of the shaft portion fit-engagement hole 22a is set to be smaller than the maximum outer diameter dimension of the projections 35 of the male spline 41 (diameter dimension of the circumcircle passing the tooth tips 41a of the male spline 41) D1 and larger than the diameter dimension D2 of the circle connecting the tooth bottoms of the male spline 41 (D2<D<D1). As a result, at least the corner portions 39 devoid of roundness are arranged at the portions of the edges of the end surfaces 35a of the projections forming the recesses 36.

As illustrated in FIG. 4B, a short cylinder portion 66 for forming the tapered locking member 65 protrudes axially from the outer peripheral edge portion of an end surface 12a of the shaft portion 12. The outer diameter D4 of the short cylinder portion 66 is set to be smaller than the inner diameter dimension D of the fit-engagement hole 22a of the hole 22. As described below, the short cylinder portion 66 serves as an alignment member when press-fitting the shaft portion 12 into the hole 22 of the hub 1.

Next, as illustrated in FIG. 4B, the seal member 99 such as an O-ring is fitted onto the proximal portion (mouth portion side) of the shaft portion 12 of the joint outer ring 5, and the axis of the hub 1 and the axis of the joint outer ring 5 of the constant velocity universal joint 3 are aligned with each other. In this state, the shaft portion 12 of the joint outer ring 5 is press-fitted into the hole 22 of the hub 1. In this process, a seal material is previously applied to the outer peripheral surface of the out-board side region including the male spline portion 41 and the short cylinder portion 66 of the shaft portion 12. As described above, there is formed the tapered portion 22d reduced in diameter in the press-fitting direction is formed on the hole 22 of the hub 1, and hence the tapered portion 22d effects centering on the hub hole 22 and the shaft portion 12 at the press-fitting start. Further, the inner diameter dimension D of the shaft portion fit-engagement hole 22a, the maximum outer diameter dimension D1 of the projections 35, and the minimum outer diameter dimension D2 of the tooth bottoms of the male spline 41 are in the relationship as described above, and hence, by press-fitting the shaft portion 12 into the shaft portion fit-engagement hole 22a of the hub 1, the projections 35 are engaged in the inner peripheral portion of the in-board side end surface of the hub 1, thus cutting the wall of the hub 1. By causing the shaft portion 12 to further advance, the inner diameter surface 37 of the shaft portion fit-engagement hole 22a of the hub 1 is cut out or pushed out by the projections 35, and there are formed in the inner diameter surface 37 the recesses 36 of a shape corresponding to the projections 35 of the shaft portion 12. In this process, since the corner portions 39 devoid of roundness are formed at the edges of the end surfaces 35a of the projections 35, the cutting of the hub 1 by the projections 35 is affected smoothly, making it possible to prevent an increase in the press-fit load. Further, the hardness of the projections 35 of the shaft portion 12 is higher than that of the inner diameter surface 37 of the shaft portion fit-engagement hole 22a of the hub 1 by 20 points or more, and hence the formation of recesses in the inner diameter surface 37 of the hub 1 is facilitated. Further, by increasing the shaft portion side hardness, it is possible to achieve an improvement in the torsional strength of the shaft portion 12.

As illustrated in FIGS. 2A and 2B, through this press-fitting process, the projections 35 of the shaft portion 12 form the recesses 36 to be fit-engaged therewith. The projections 35 are engaged in the inner diameter surface 37 of the hub 1, whereby the hole 22 is slightly diverged, and axial movement of the projections 35 is permitted. On the other hand, when the axial movement stops, the inner diameter surface 37 tends to be restored to the original diameter, resulting in a reduction in diameter. In other words, the hub 1 undergoes outward elastic deformation at the time of press-fitting of the projections 35, and a pre-load corresponding to this elastic deformation is imparted to the surfaces of the portions of the projections 35 fit-engaged with the recesses 36. Thus, the recesses 36 are held in close contact with the surfaces of the projections over the entire axial range thereof. As a result, the recess/projection fit-engagement structure M is formed. A seal material is provided in the fit-engagement portion 38 of the projections 35 and the recesses 36, and hence it is possible to prevent intrusion of foreign matter into the fit-engagement portion 38.

Further, with the press-fitting of the shaft portion 12, plastic deformation occurs on the hub 1 side, and hence work hardening occurs on the surfaces of the recesses 36. Thus, the inner diameter surface 37 of the hub 1 on the recess 36 side is hardened, making it possible to achieve an improvement in terms of rotary torque transmission property.

The tapered portion 22d can function as a guide when starting the press-fitting of the shaft portion 12. Thus, it is possible to press-fit the shaft portion 12 of the joint outer ring 5 into the hole 22 of the hub 1 without involving any decentering. Further, the outer diameter dimension D4 of the short cylinder portion 66 is set smaller than the inner diameter dimension D of the fit-engagement hole 22a of the hole 22, and hence the short cylinder portion 66 can function as an alignment member, whereby it is possible to press-fit the shaft portion 12 into the hub 1 while preventing decentering, thereby allowing a more stable press-fitting.

It is necessary for the recess/projection fit-engagement structure M to be arranged so as to avoid as much as possible the inner sides of the raceway surfaces 26, 27, 28, and 29 of the bearing 2. In particular, it is desirable that the inner sides of the intersections of the lines passing the contact angles on the inner races 28 and 29 be avoided, and that the recess/projection fit-engagement structure M be formed in a partial axial region between those intersections. This helps to suppress generation of hoop stress in the bearing raceway surfaces. Thus, it is possible to prevent generation of bearing problems such as a reduction in rolling fatigue life, crack generation, and stress corrosion cracking, making it possible to provide a high quality bearing.

Figure 29:
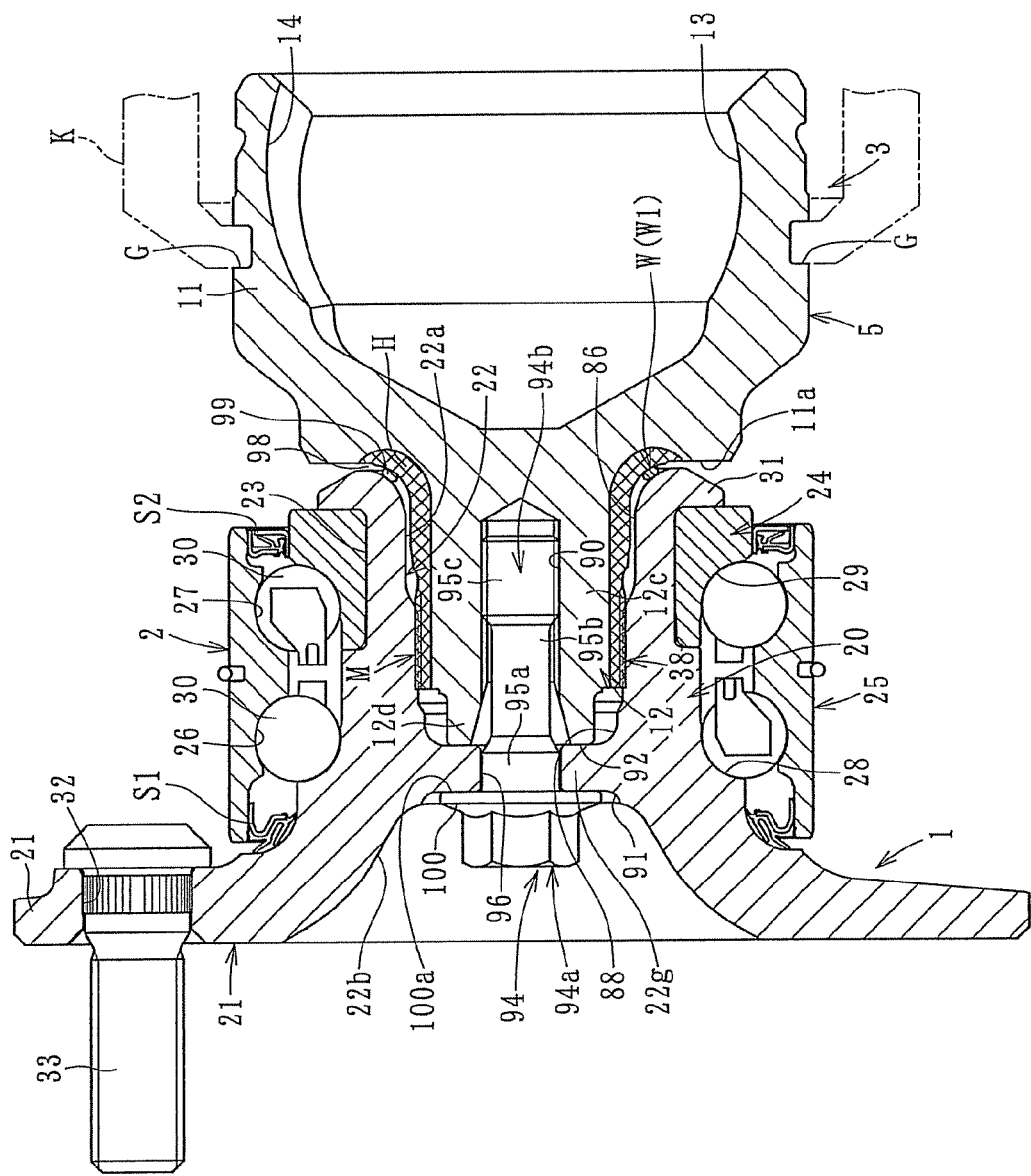
FIG. 29 is a sectional view of a bearing device for a wheel according to another embodiment.

When press-fitting the shaft portion 12 of the joint outer ring 5 into the hole 22 of the hub 1, there is provided a step surface G on the outer peripheral surface of the mouth portion 11 of the joint outer ring 5 as illustrated in FIG. 29, etc., and a press-fitting jig K indicated by a phantom line is engaged with the step surface G before imparting a press-fit load (axial load) to the step surface G from the press-fitting jig K. The step surface G may be provided over the entire periphery or at a predetermined pitch along the periphery. It is only necessary for the press-fitting jig used to be capable of imparting an axial load in correspondence with the shape of the step surface G.

Figure 5:
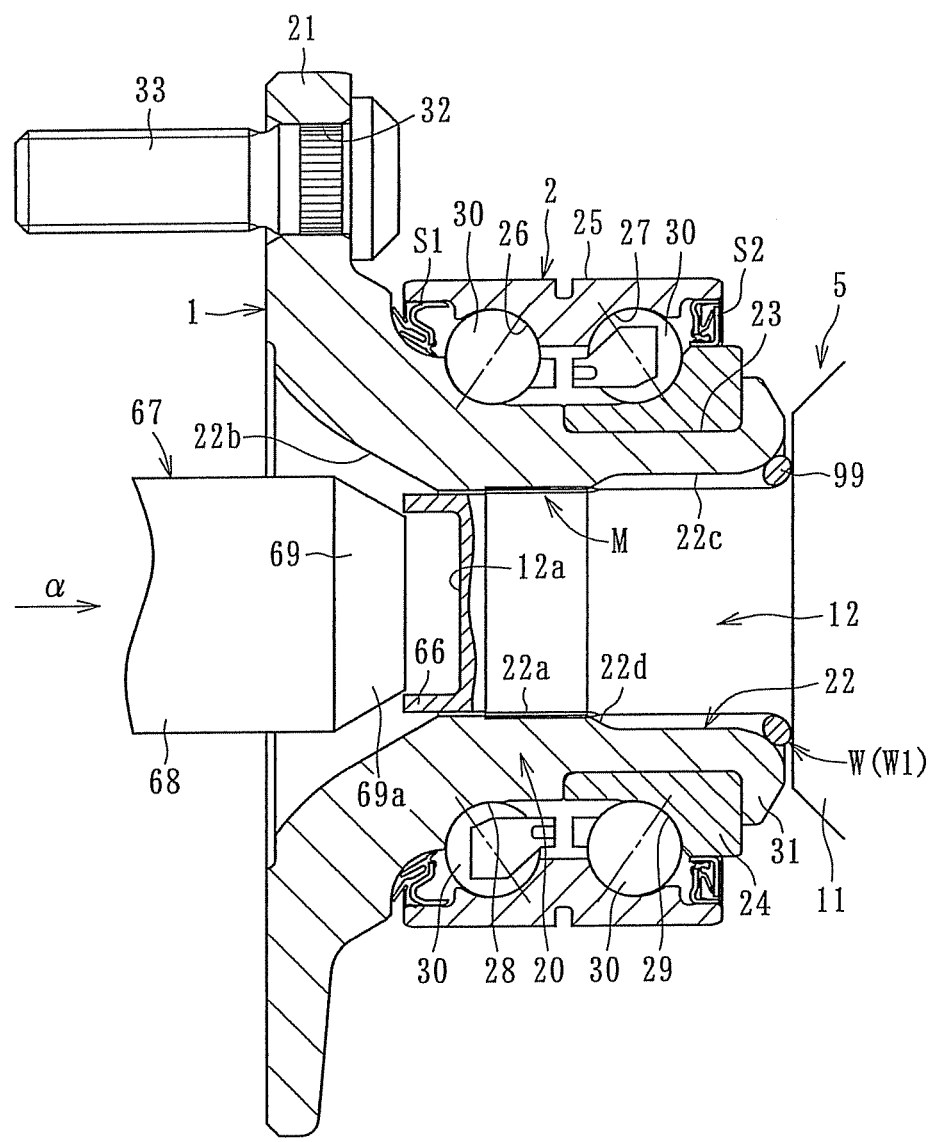
FIG. 5 is a sectional view illustrating a method of assembling the bearing device for a wheel.

As illustrated in FIG. 5, in the state in which the shaft portion 12 of the joint outer ring 5 and the hub 1 are integrated through the intermediation of the recess/projection fit-engagement structure M, the short cylinder portion 66 protrudes to the out-board side from the fit-engagement hole 22a.

Figure 6:
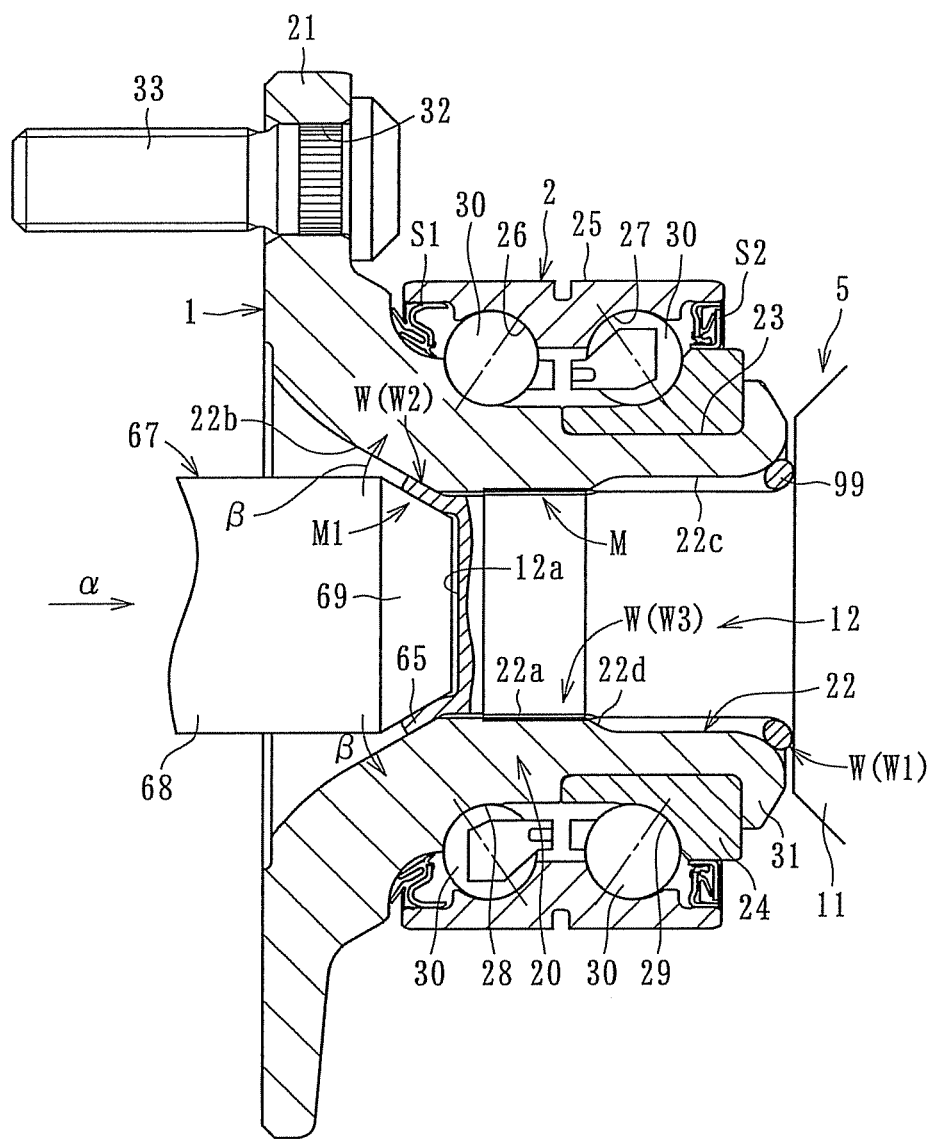
FIG. 6 is a sectional view illustrating a method of assembling the bearing device for a wheel.

The short cylinder portion 66 is subjected to plastic deformation so as to be diverged by using a jig 67. The jig 67 is provided with a columnar main body portion 68 and a truncated cone portion 69 connected to the forward end portion of the main body portion 68. The truncated cone portion 69 of the jig 67 has an inclined surface 69a whose inclination angle is substantially the same as the inclination angle of the tapered hole 22b, and the outer diameter of the forward end portion thereof is set to a dimension that is the same as or slightly smaller than the inner diameter of the short cylinder portion 66. By forcing in the truncated cone portion 69 of the jig 67 from the out-board side via the tapered hole 22b, a load in the direction of an arrow α is imparted, whereby, as illustrated in FIG. 6, a diverging force in the direction of an arrow β is imparted to the short cylinder portion 66. In this process, the short cylinder portion 66 undergoes outward plastic deformation due to the truncated cone portion 69 of the jig 67, and is pressed against the inner diameter surface of the tapered hole 22b. As a result, the seal material previously applied to the outer peripheral surface of the short cylinder portion 66 is held in close contact with the inner diameter surface of the tapered hole 22b, thus forming the foreign matter intrusion prevention means W2. Further, the plastically deformed short cylinder portion 66 forms the tapered locking member 65 to be engaged with the inner diameter surface of the tapered hole 22b, forming the detachment prevention structure M1 for the shaft portion 12. Note that, when the load in the direction of the arrow α is imparted by the jig 67, the load is received, with a part of the hub 1, the constant velocity universal joint 3, etc. being supported by a stationary member (not shown). The inner diameter surface of the short cylinder portion 66 also be formed in a tapered shape diverging on the shaft end side. With this shape, it is possible to shape the inner diameter surface of the shaft portion 12 by forging, which leads to a reduction in cost.

Further, in order to reduce the load of the jig 67 in the direction of the arrow α, a cutout may be formed in the short cylinder portion 66, or the conical surface of the truncated cone portions 69 of the jig 67 may be partially arranged in a circumferential direction. When a cutout is formed in the short cylinder portion 66, the short cylinder portion 66 is easier to diverge. When the conical surface of the truncated cone portion 69 of the jig 67 is partially arranged in the circumferential direction, the portion diverging the short cylinder portion 66 constitutes a circumferential part, and hence it is possible to reduce the forcing-in load of the jig 67.

In the recess/projection fit-engagement structure M, the press-fitting margin Δd of the projections 35 with respect to the hub 1 and the height h of the projections are set to the following relationship: $0.3 < \Delta d/2 \, h < 0.86$. In this case, as illustrated in FIG. 7, the press-fitting margin Δd is to be expressed as the difference between the maximum outer diameter dimension D1 of the shaft portion 12 (diameter of the circumcircle passing the tooth tips 41a of the projections 35) and the inner diameter dimension D of the shaft portion fit-engagement hole 22a of the hub 1, i.e., (D1−D). As a result, the middle portions in the height direction of the projections 35 are engaged in the inner diameter surface of the hub 1, and hence it is possible to secure a sufficient press-fitting margin for the projections 35, making it possible to reliably form the recesses 36.

When the value of Δd/2 h is 0.3 or less, the torsional strength is rather low. When the value of Δd/2 h exceeds 0.86, the entire projections 35 are engaged in the mating members due to a minute decentering or press-fitting inclination at the time of press-fitting, and the formability of the recess/projection fit-engagement structure M deteriorates, and hence there is a fear of the press-fit load increasing abruptly. When the formability of the recess/projection fit-engagement structure M deteriorates, not only is the torsional strength reduced, but also the expansion amount of the hub outer diameter increases, which affects the function of the bearing 2 attached to the hub 1, and involves problems such as a reduction in rotation service life. In contrast, when Δd/2 h is set to the range of 0.3 to 0.86, the formability of the recess/projection fit-engagement structure M is stabilized, and there is involved no variation in press-fit load, making it possible to obtain a stable torsional strength.

In the recess/projection fit-engagement structure M described above, the projections 35 and the recesses 36 are entirely held in close contact with each other through an intermediation of the fit-engagement portion 38, and hence there is formed no gap that generates play in the radial direction and the circumferential direction. Thus, all the fit-engagement portion contributes to rotary torque transmission, and stable torque transmission is possible. In addition, no abnormal noise is generated.

Further, there is no need to previously form a female spline or the like on the member (in this case, hub 1) in which the recesses 36 are formed. Thus, it is possible to attain superior productivity, and because there is no need to perform interspline phase matching, it is possible to achieve an improvement in terms of assembly property. Further, it is possible to avoid damage of the tooth surfaces at the time of press-fitting, making it possible to maintain a stable fit-engagement state.

In particular, it is possible to cut out or push out the inner diameter surface 37 of the hole 22 of the hub 1 by the corner portions 39 devoid of roundness provided on the projections 35, and hence it is possible to prevent an increase in press-fit load. Further, the inner side of the hub 1 is relatively soft, and hence the recesses of the hub 1 are fit-engaged with the projections 35 of the shaft portion 12 with high adherence. Thus, generation of play in the radial and the circumferential direction is prevented, which proves the bearing device still more effective.

In the bearing device for a wheel described above, the tapered locking member 65 extending from the end portion of the shaft portion 12 of the joint outer ring 5 to the out-board side is held in press contact or contact with the inner diameter surface of the tapered hole 22b, whereby there is provided the detachment prevention structure M1 for the shaft portion 12 between the end portion of the shaft portion 12 of the joint outer ring 5 and the inner diameter surface 37 of the hub. 1. Due to the detachment prevention structure M1, detachment to the in-board side of the shaft portion 12 of the joint outer ring 5 from the hub 1 is prevented, making it possible to maintain a stable connection state. Further, because the detachment prevention structure M1 is the tapered locking member 65, it is possible to omit the screw fastening as performed in the prior art. Thus, there is no need to form on the shaft portion 12 a screw portion protruding from the hole 22 of the hub 1, making it possible to achieve a reduction in weight. Further, it is possible to omit the screw fastening operation, making it possible to achieve an improvement in terms of assembly workability. Further, in the tapered locking member 65, it is only necessary to diverge a part of the shaft portion 12 of the joint outer ring 5, thus facilitating the formation of the detachment prevention structure M1. When the shaft portion 12 of the joint outer ring 5 moves to the outboard side, it is necessary to apply a pressing force in the direction to which the shaft portion 12 is further press-fitted, and it is very difficult for positional deviation to the out-board side of the shaft portion 12 of the joint outer ring 5 to be generated. Even if positional deviation occurs in this direction, the bottom portion of the mouth portion 11 of the joint outer ring 5 abuts the orbital-formed portion 31 of the hub 1, and hence the shaft portion 12 of the joint outer ring 5 is not detached from the hub 1.

Further, in the bearing device for a wheel described above, the foreign matter intrusion prevention means W1 and W2 are respectively provided on the in-board side and the out-board side of the recess/projection fit-engagement structure M, and hence intrusion of rainwater and foreign matter into the recess/projection fit-engagement structure M from both axial end sides is prevented, making it possible to maintain the close contact of the projections 35 and the recesses 36 in a stable manner for a long period of time.

Figure 9A:
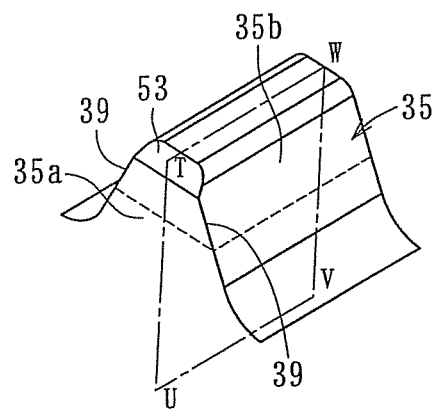
FIG. 9A is a perspective view of another example of the projection of the recess/projection fit-engagement structure.
Figure 9B:
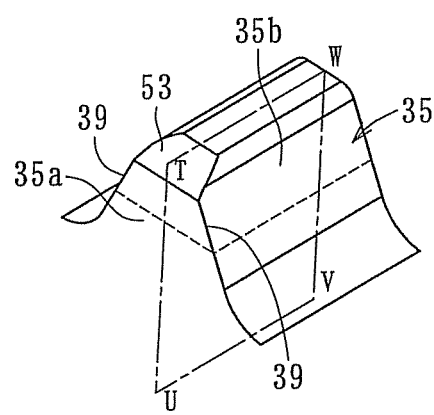
FIG. 9B is a perspective view of another example of the projection of the recess/projection fit-engagement structure.
Figure 9C:
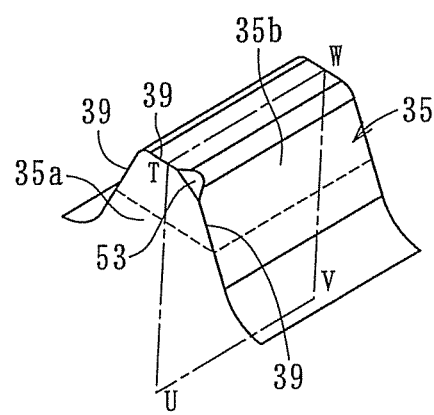
FIG. 9C is a perspective view of another example of the projection of the recess/projection fit-engagement structure.

As illustrated in FIGS. 9A through 9C, as the projections 35 formed on the shaft portion 12, it is also possible to use ones provided with cutouts 53 at the apex portions of the press-fitting start side end surfaces 35a of the projections 35. FIG. 9A illustrates a cutout 53 formed by C-beveling (see FIG. 10A), and FIG. 9B illustrates a cutout 53 formed by R-beveling (see FIG. 10B). Apart from this, as illustrated in FIGS. 9C and 10C, it is also possible to form a C-beveled cutout 53 at one corner portion on the outer side. In the case of FIGS. 9A and 9B, the corner portions 39 devoid of roundness can be formed by both oblique sides of the end surface 35a except for the cutout 53. In the case of FIG. 9C, the corner portions 39 can be formed by both oblique sides and the top side of the end surface 35a except for the cutout 53.

By thus providing the cutouts 53, it is possible to prevent damage such as chipping or deformation of the apex portions of the end surfaces 35a on the press-fitting start side of the projections 35 at the time of press-fitting or the like. Thus, the handling of the male spline 41 is facilitated, and there is no need to separately take protection measures at the press-fitting start ends of the projections 35, making it possible to reduce the control man-hours and achieve a reduction in cost. Further, when performing quenching on the projections 35 in order to enhance the hardness thereof, it is possible to prevent generation of quenching crack.

Figure 10A:
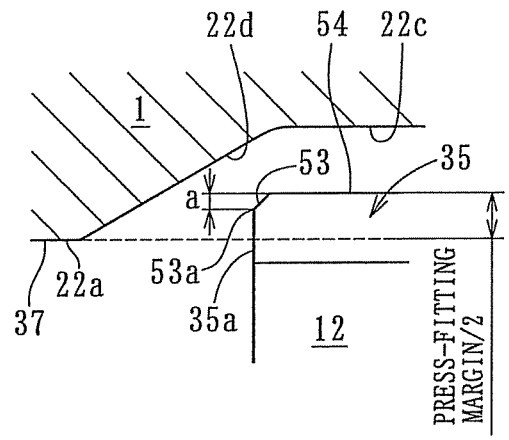
FIG. 10A is a projected view of FIG. 9A.
Figure 10B:
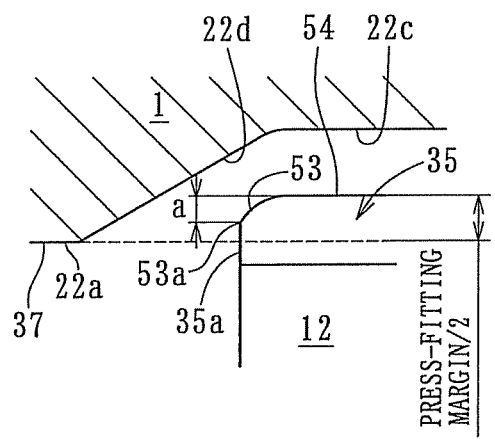
FIG. 10B is a projected view of FIG. 9B.
Figure 10C:
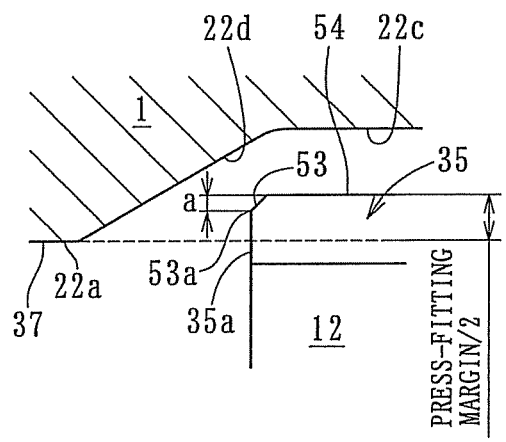
FIG. 10C is a projected view of FIG. 9C.

As illustrated in FIGS. 10A through 10C, in the case in which the cutout 53 is provided, the radial length "a" from the top portion 54 of the projection 35 to the anti-apex side end edge 53a of the cutout 53 is set to the range of 0<a<Δd/2, where Δd is the press-fitting margin of the projection 35 with respect to the hub 1 (which is to be expressed as the diameter difference between the maximum outer diameter dimension D1 of the shaft portion 12 and the inner diameter dimension D of the shaft portion fit-engagement hole 22a of the hub 1, i.e., (D1−D); see FIG. 7). This means that, as illustrated in FIGS. 10A through 10C, when the projection 35 is projected onto the plane TUVW illustrated in FIGS. 9A through 9C, the anti-apex side end edge 53a of the cutout 53 exists on the outer side of the inner diameter surface 37 of the hub 1. In this case, the corner portion 39 devoid of roundness is formed on the outer side of the inner diameter surface 37, and hence the corner portion 39 can reliably cut into the inner diameter surface 37. More specifically, it is desirable for the radial length "a" from the apex portion of the projection 35 to the anti-apex side end edge of the cutout 53 to be 0.3 mm or less. The inclination angle of the C-beveling illustrated in FIGS. 9A and 9C and the radius of curvature of the R-beveling illustrated in FIG. 9B can be arbitrarily set to a range satisfying the following formula: 0<a<Δd/2.

Figure 11:
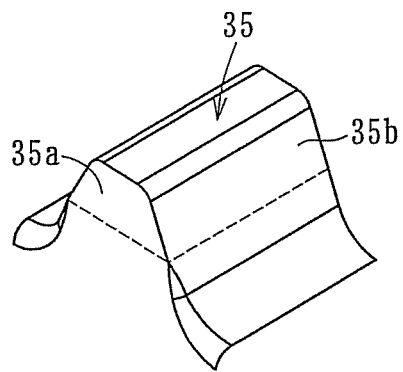
FIG. 11 is a perspective view of another example of the projection of the recess/projection fit-engagement structure.
Figure 12A:
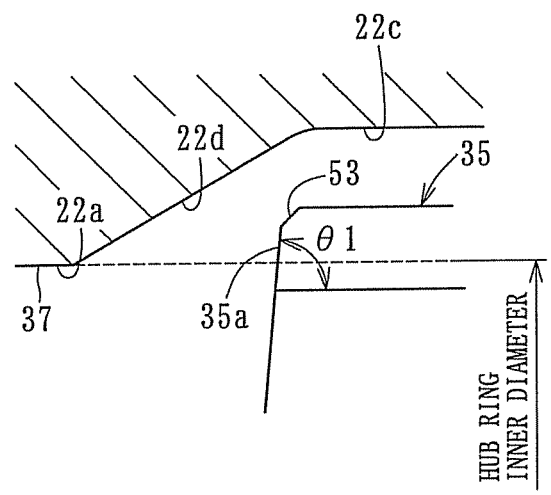
FIG. 12A is a projected view of FIG. 11.
Figure 12B:
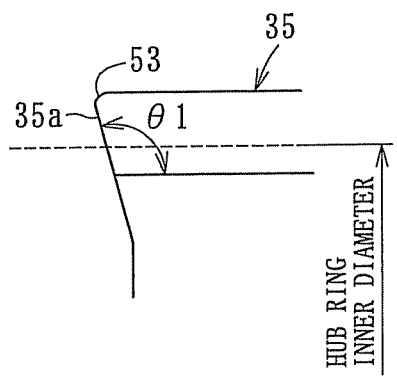
FIG. 12B is a projected view of another example of the projection of the recess/projection fit-engagement structure.

While in FIGS. 10A through 10C the crossing angle made by the press-fitting start side end surface 35a of the projection 35 and the axis in the axial section is 90°, it is also possible for the crossing angle θ1 to beset smaller than 90° as illustrated in FIGS. 11 and 12A or for the crossing angle θ1 to be set larger than 90° as illustrated in 12B.

It is desirable for the crossing angle θ1 to be set to the range of $50°≤θ1≤110°$. When the crossing angle θ1 is less than 50°, the press-fit load increases, and the formability of the recess/projection fit-engagement structure M deteriorates. When the crossing angle θ1 exceeds 110°, the end surface 35a is excessively inclined toward the press-fitting direction, and there is a fear of the projection 35 being chipped. More preferably, the crossing angle θ1 is set to the range of $70°≤θ1≤110°$.

Figure 13A:
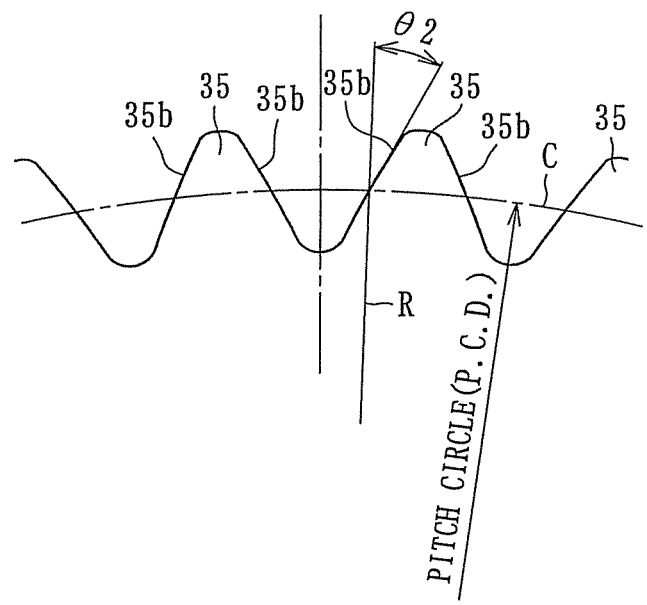
FIG. 13A is a front view of the projections illustrated in FIG. 3A.

As illustrated in FIG. 13A, in the recess/projection fit-engagement structure M, assuming that, in the pitch circle of the projections 35, the angle made by the radial line and the side surface 35b of each projection is θ2, the angle θ2 is set to the range of $0°≤θ2≤45°$. In this case, the projection pitch circle is the circle C connecting the middle point in the height direction of the projections 35. In FIG. 13A, θ is approximately 30°. Assuming that the ratio of the pitch circle diameter PCD of the projections 35 to the number of projections Z, that is, PCD/Z, is P, P is set to the range of $0.30<P<1.0$. Here, the projection pitch circle diameter is the diameter of the above-mentioned circle C.

Figure 13B:
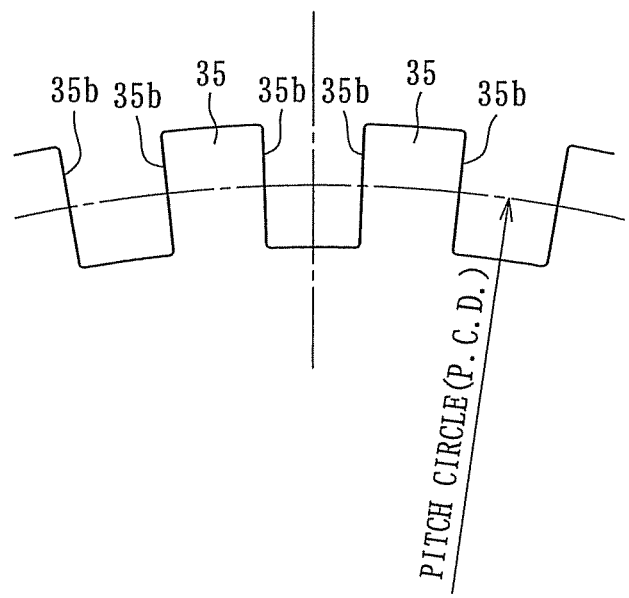
FIG. 13B is a front view of another example of the projections.
Figure 13C:
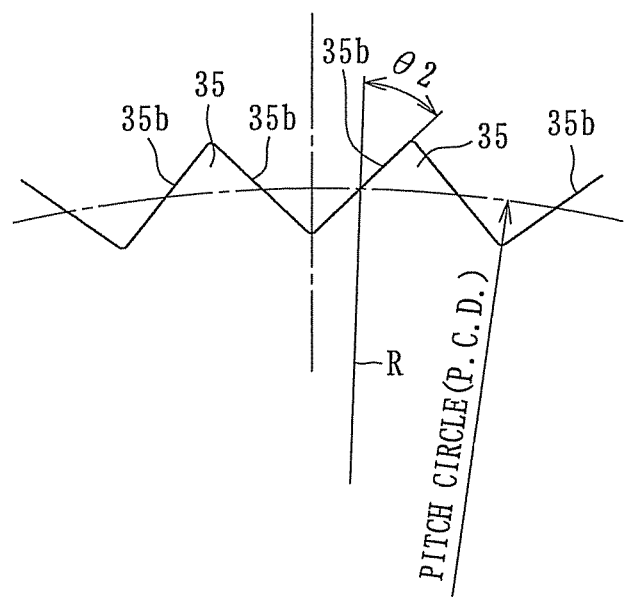
FIG. 13C is a front view of another example of the projections.

While in FIG. 13A the projections 35 have a triangular sectional shape with a rounded apex portion, it is also possible to adopt projections 35 of other shapes as illustrated in FIGS. 13B and 13C. In FIG. 13B, the projections 35 have a rectangular sectional shape, and in FIG. 13C, the projections 35 have a triangular sectional shape having a tip angle of approximately 90°. In the example of FIG. 13B, θ2 is approximately 0°, and in the example of FIG. 13C, θ2 is approximately 45°.

Figure 14:
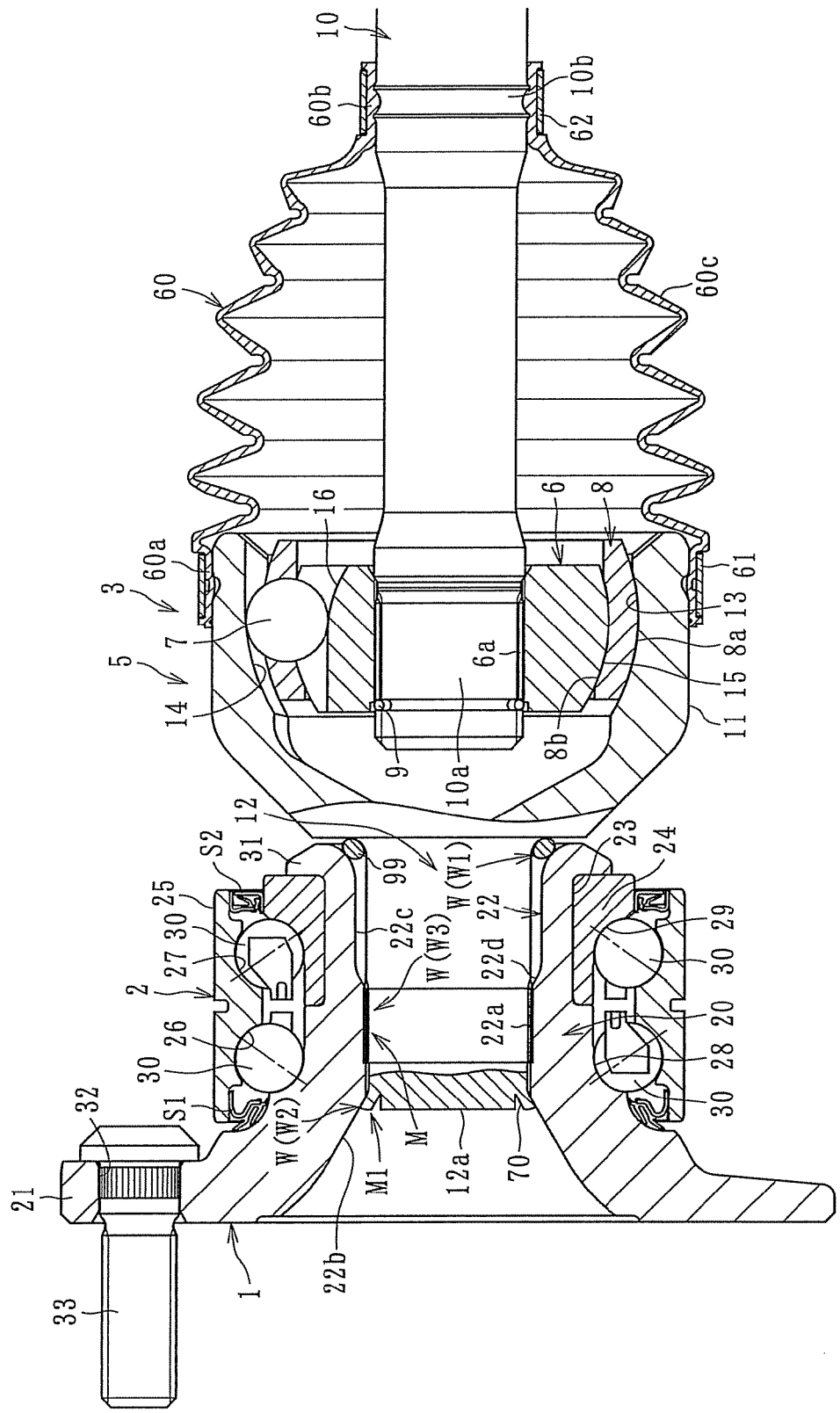
FIG. 14 is a sectional view of a bearing device for a wheel according to another embodiment.

FIG. 14 illustrates another construction example of the detachment prevention structure M1. In this bearing device for a wheel, the shaft portion 12 has no short cylinder portion 66 illustrated in FIG. 4, and instead, an outwardly protruding tapered locking member 70 is provided at one solid end portion of the shaft portion 12 so as to form the detachment prevention structure M1 for the shaft portion 12.

Figure 15:
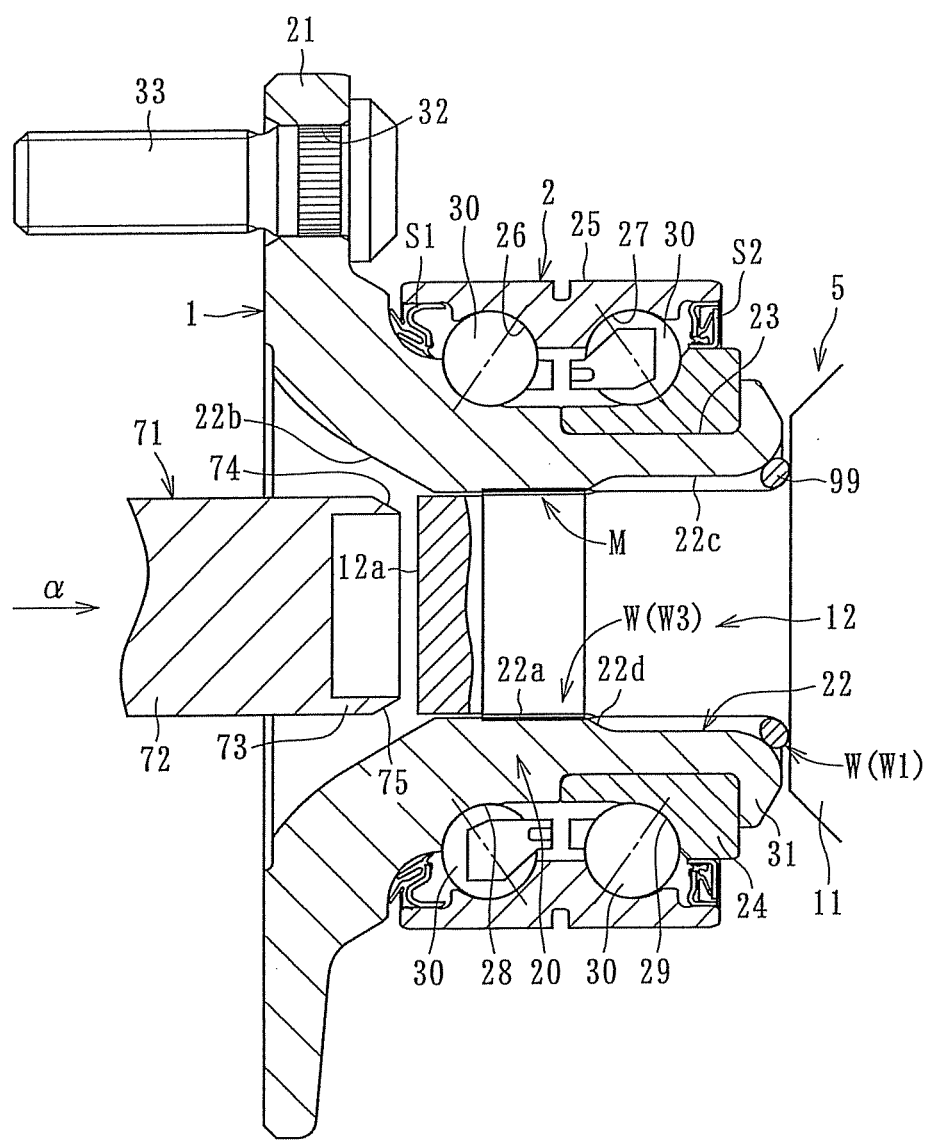
FIG. 15 is a sectional view illustrating a method of assembling the bearing device for a wheel of FIG. 14.
Figure 16:
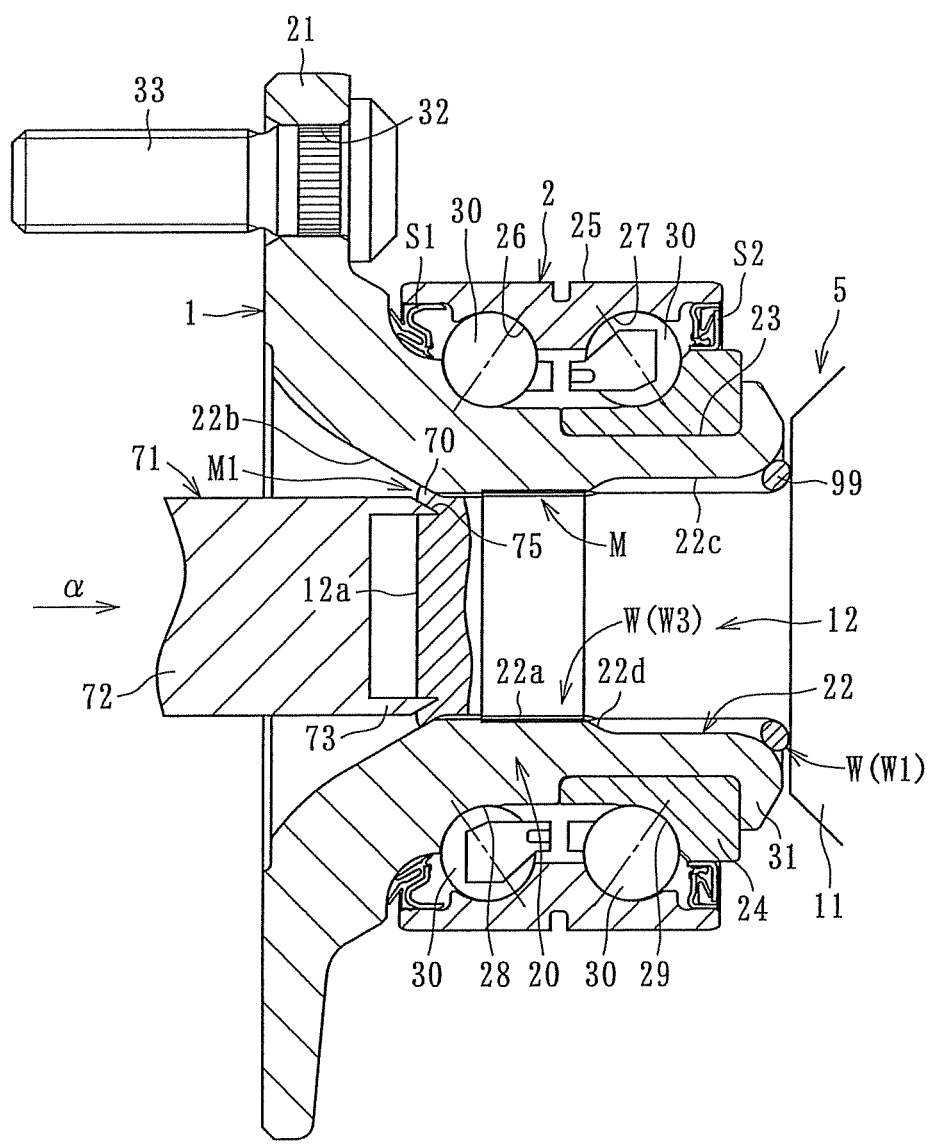
FIG. 16 is a sectional view illustrating the method of assembling the bearing device for a wheel of FIG. 14.

The tapered locking member 70 can be formed by using a jig 71 illustrated in FIG. 15. The jig 71 includes a columnar main body portion 72, and a cylindrical portion 73 continuous with the forward end portion of the main body portion 72. Further, a cutout 74 is provided at the forward end of the outer peripheral surface of the cylindrical portion 73, whereby a wedge portion 75 is formed at the forward end of the cylindrical portion 73. When the wedge portion 75 is driven into the out-board side end portion of the shaft portion 12 (When a load in the direction of the arrow α is applied), the outer peripheral region of the shaft end of the shaft portion 12 is plastically deformed outwardly by the cutout 74 as illustrated in FIG. 16. As a result, the tapered locking member 70 is formed, and at least a part of the tapered locking member 70 is held in press contact or contact with the inner diameter surface of the tapered hole 22b. Thus, as in the case of the tapered locking member 65 illustrated in FIG. 1, etc., it is possible to reliably prevent detachment of the shaft portion 12 from the hub 1. While in the illustrated example the cutout 74 is provided in the outer peripheral surface of the cylindrical portion 73 so as to form the wedge portion 75, it is also possible to provide the cutout in the inner diameter surface so as to form the wedge portion 75. It is also possible to provide a seal material between the outer peripheral surface of the tapered locking member 70 and the inner diameter surface of the tapered hole 22b so as to constitute the foreign matter intrusion prevention means W2.

Figure 17:
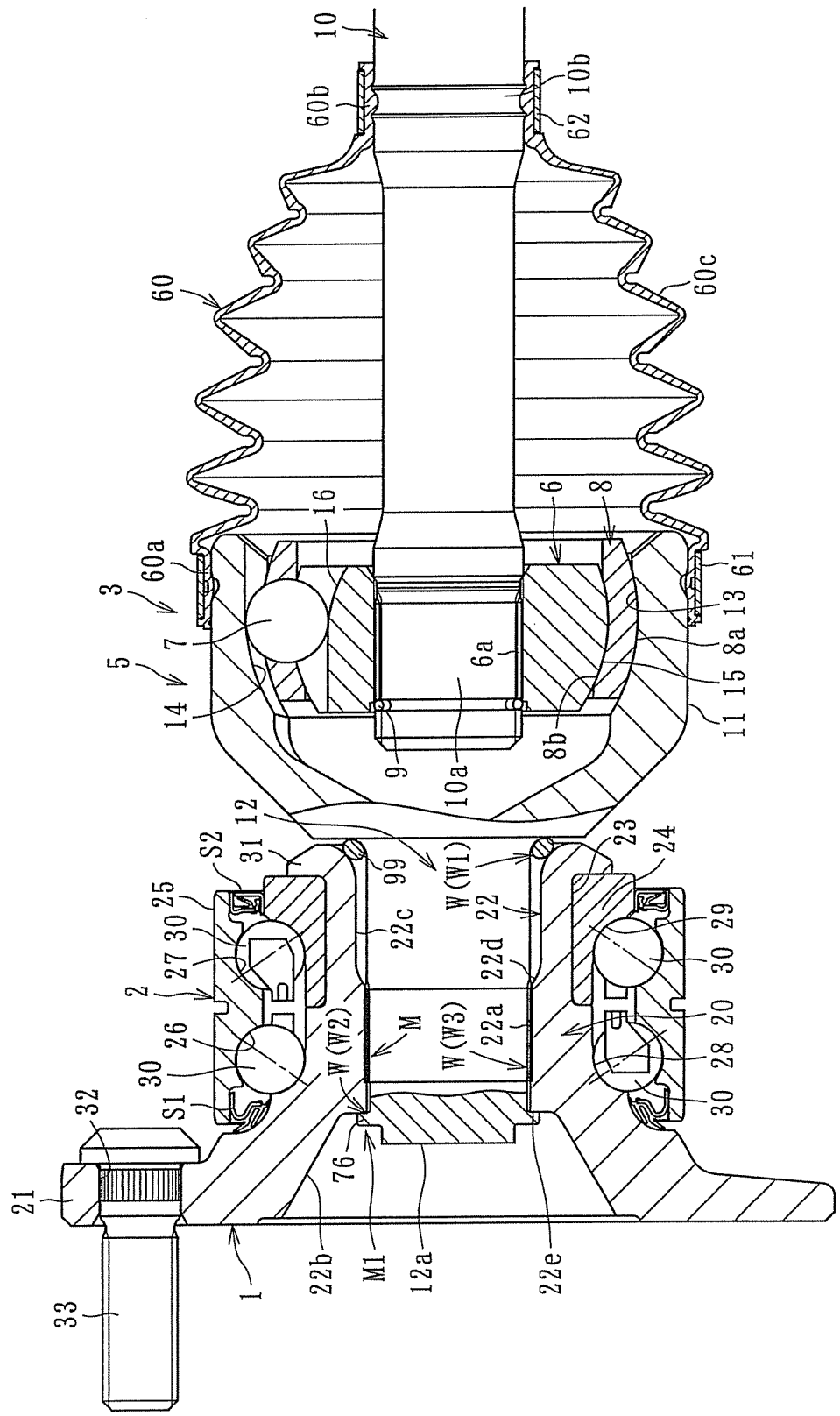
FIG. 17 is a sectional view of a bearing device for a wheel according to another embodiment.

FIG. 17 illustrates another construction example of the detachment prevention structure M1. In the detachment prevention structure M1, a part of the shaft portion 12 is caulked so as to diverge it outwardly to thereby constitute an outer flange-like locking member 76. A step surface 22e is provided between the shaft portion fit-engagement hole 22a of the hub 1 and the tapered hole 22, and the outer flange-like locking member 76 is held in press contact or contact with the step surface 22e.

Figure 18:
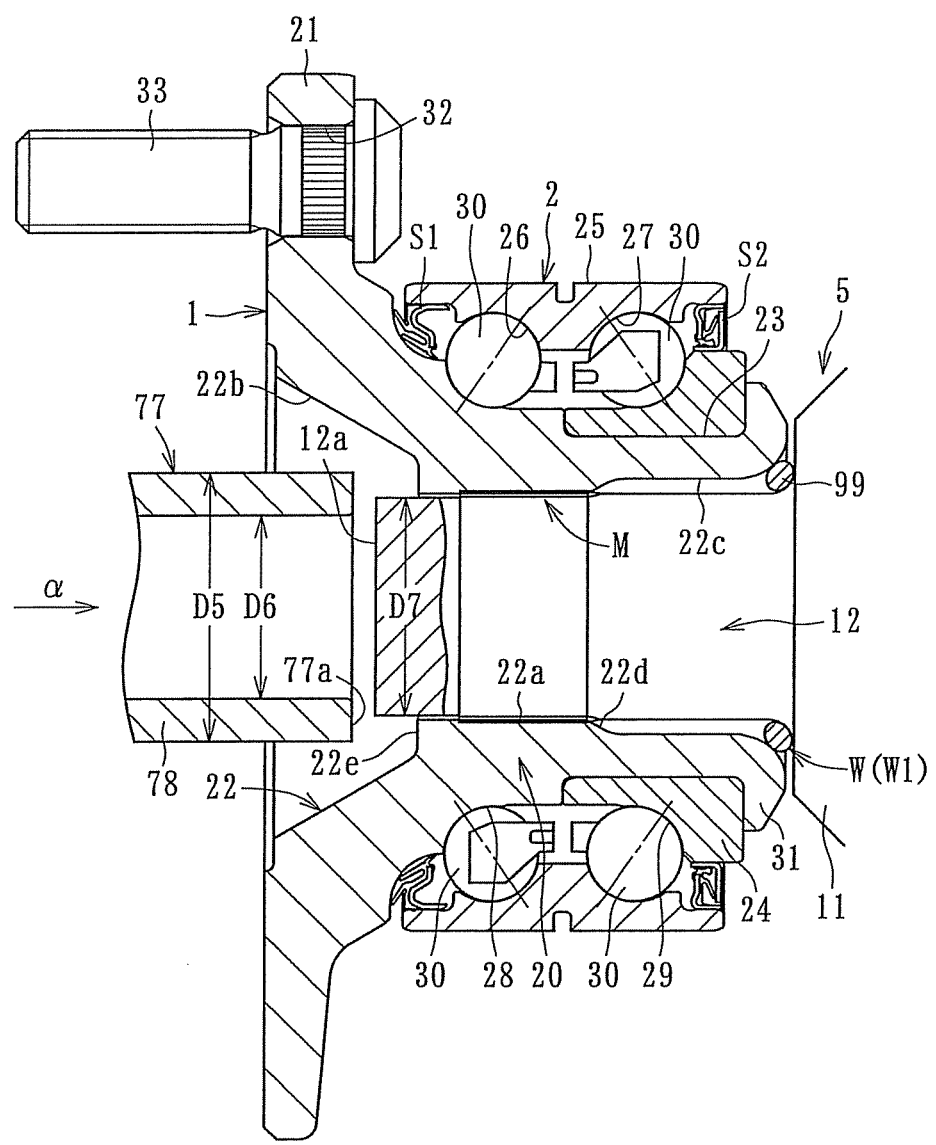
FIG. 18 is a sectional view illustrating a method of assembling the bearing device for a wheel of FIG. 17.

The outer flange-like locking member 76 can be formed by using a jig 77 illustrated in FIG. 18. The jig 77 includes a cylindrical body 78. The outer diameter D5 of the cylindrical body 78 is set larger than the outer diameter D7 of the end portion of the shaft portion 12, and the inner diameter D6 of the cylindrical body 78 is set smaller than the outer diameter D7 of the end portion of the shaft portion 12.

Figure 19:
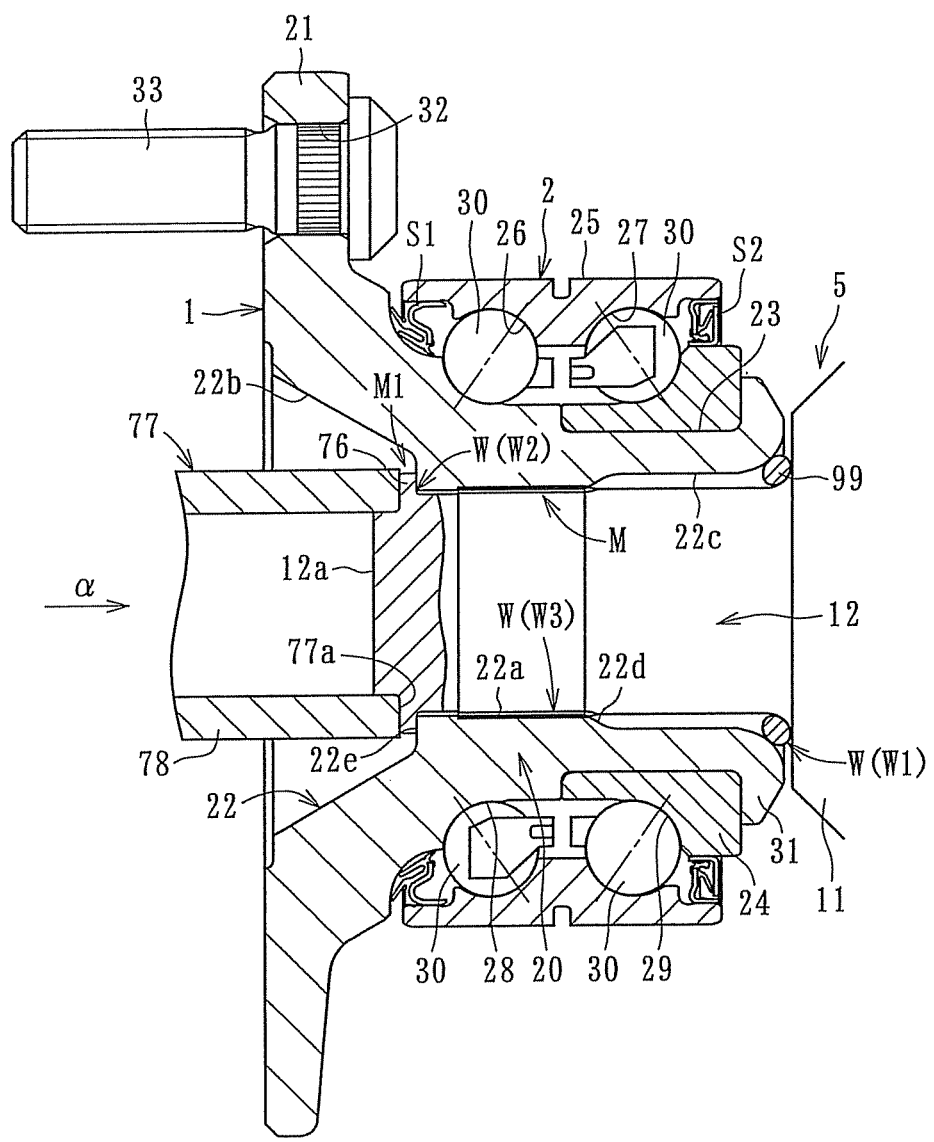
FIG. 19 is a sectional view illustrating the method of assembling the bearing device for a wheel of FIG. 17.

Thus, the axis of the jig 77 and the axis of the shaft portion 12 of the joint outer ring 5 are aligned with each other, and in this state, a load is applied to the end surface 12a of the shaft portion 12 in the direction of the arrow α with use of the end surface 77a of the jig 77, whereby, as illustrated in FIG. 19, the outer periphery of the end surface 12a of the shaft portion 12 is crushed, making it possible to form the outer flange-like locking member 76.

The outer flange-like locking member 76 is axially engaged with the step surface 22e, whereby, as in the case of the tapered locking member 65 illustrated in FIG. 1, etc., it is possible to reliably prevent detachment of the shaft portion 12 from the hub 1. It is also possible to provide a seal member between the outer flange-like locking member 76 and the step surface 22e, thereby constituting the foreign matter intrusion prevention means W2.

Figure 20A:
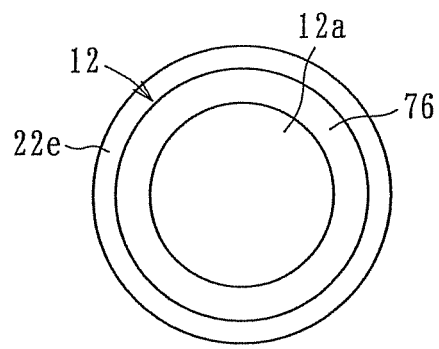
FIG. 20A is a front view of an end surface of a shaft portion of a joint outer ring of the bearing device for a wheel of FIG. 17, illustrating an outer-flange-like locking portion formed over the entire periphery.
Figure 20B:
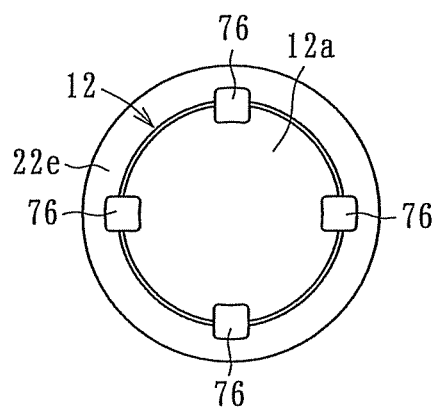
FIG. 20B is a front view of the end surface of the shaft portion of the joint outer ring of the bearing device for a wheel of FIG. 17, illustrating outer-flange-like locking portions arranged at predetermined circumferential pitches.

As illustrated in FIG. 20A, the outer flange-like locking member 76 is formed continuously in an annular fashion. Alternatively, as illustrated in FIG. 20B, a plurality of outer flange-like locking members 76 may be arranged intermittently in the circumferential direction at a predetermined pitch. The outer flange-like locking member 76 illustrated in FIG. 20B can be formed by using a jig in which pressing portions are arranged circumferentially at a predetermined pitch (e.g., 90°).

Figure 21:
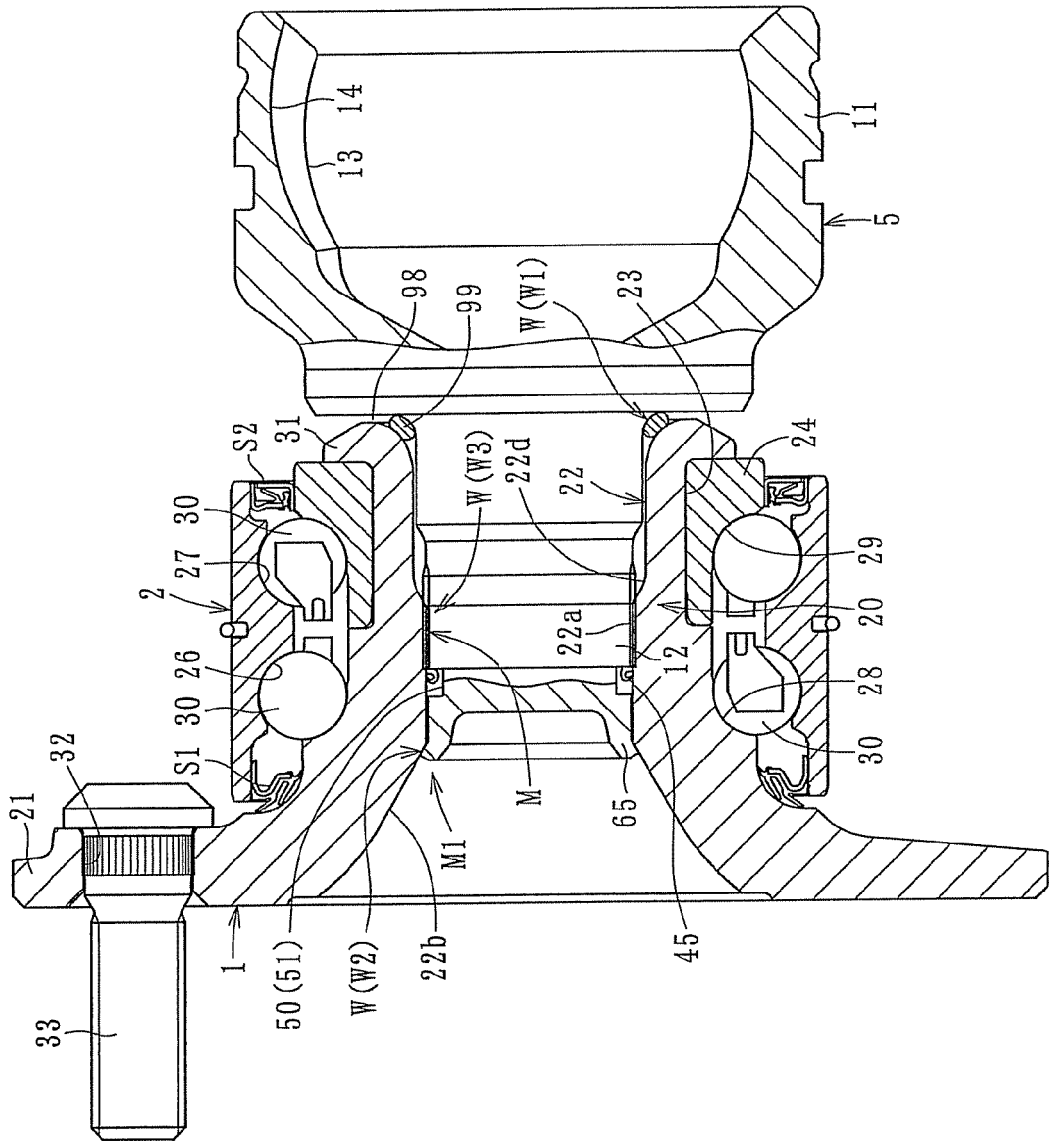
FIG. 21 is a sectional view of a bearing device for a wheel according to another embodiment.
Figure 22:
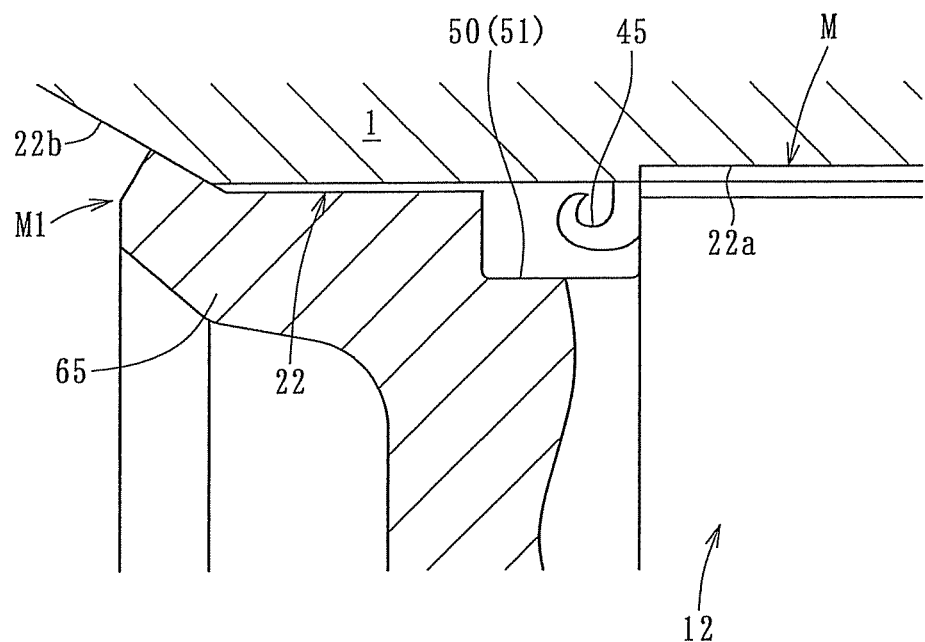
FIG. 22 is a main portion enlarged sectional view of the bearing device for a wheel of FIG. 21.
Figure 23:
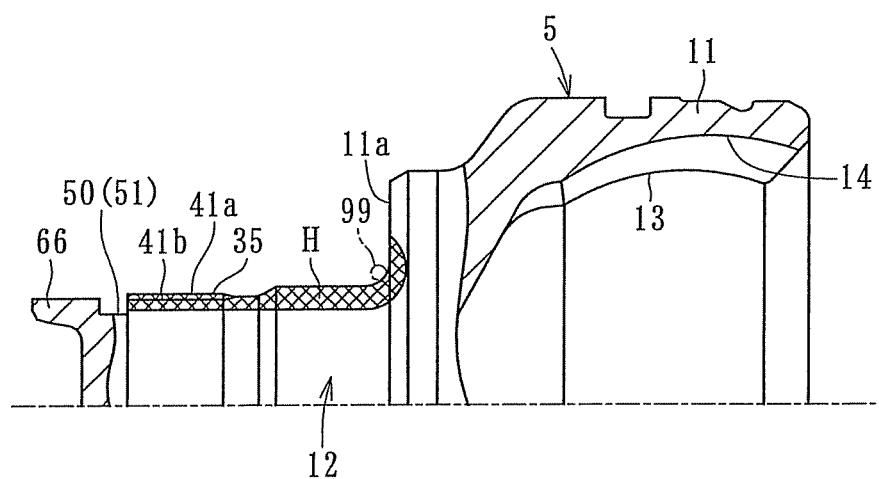
FIG. 23 is a sectional view of a joint outer ring prior to the assembly of the bearing device for a wheel of FIG. 21.

As illustrated in FIGS. 21 and 22, when press-fitting the shaft portion 12 of the joint outer ring 5 into the hub 1, some material protrudes out of the recesses 36 by the cutting or pushing action of the projections 35, thereby forming a protruding portion 45. The protruding portion 45 is generated in an amount corresponding to the volume of the portion of the projections 35 fit-engaged with the recesses 36.

If the protruding portion 45 is left as it is, there is a fear in that the protruding portion 45 may fall and enter the interior of the vehicle. In view of this, as illustrated in FIGS. 21 and 22, a pocket portion 50 for accommodating the protruding portion 45 is formed in the outer peripheral surface of the shaft portion 12, whereby the protruding portion 45 is accommodated in the pocket portion 50 while curling, and retained therein. Accordingly, it is possible to prevent the protruding portion 45 from falling to cause the above-mentioned problem.

The pocket portion 50 can be formed, for example, by providing a circumferential groove 51 in the portion of the outer peripheral surface of shaft portion 12 on the out-board side with respect to the male spline 41. In this case, as indicated by the cross-hatching of FIG. 23, the hardened layer H is not provided in the pocket portion 50, however, it is formed in the continuous region from the out-board side end edge of the male spline 41 to a part of the bottom wall of the mouth portion 11 of the joint outer ring 5. While in FIG. 23 the hardened layer H does not reach the pocket portion 50, the hardened layer H may reach the pocket portion. Also in this case, no hardened layer is formed on the short cylinder portion 66 on which the outer flange-like locking member 76 is formed.

Figure 24:
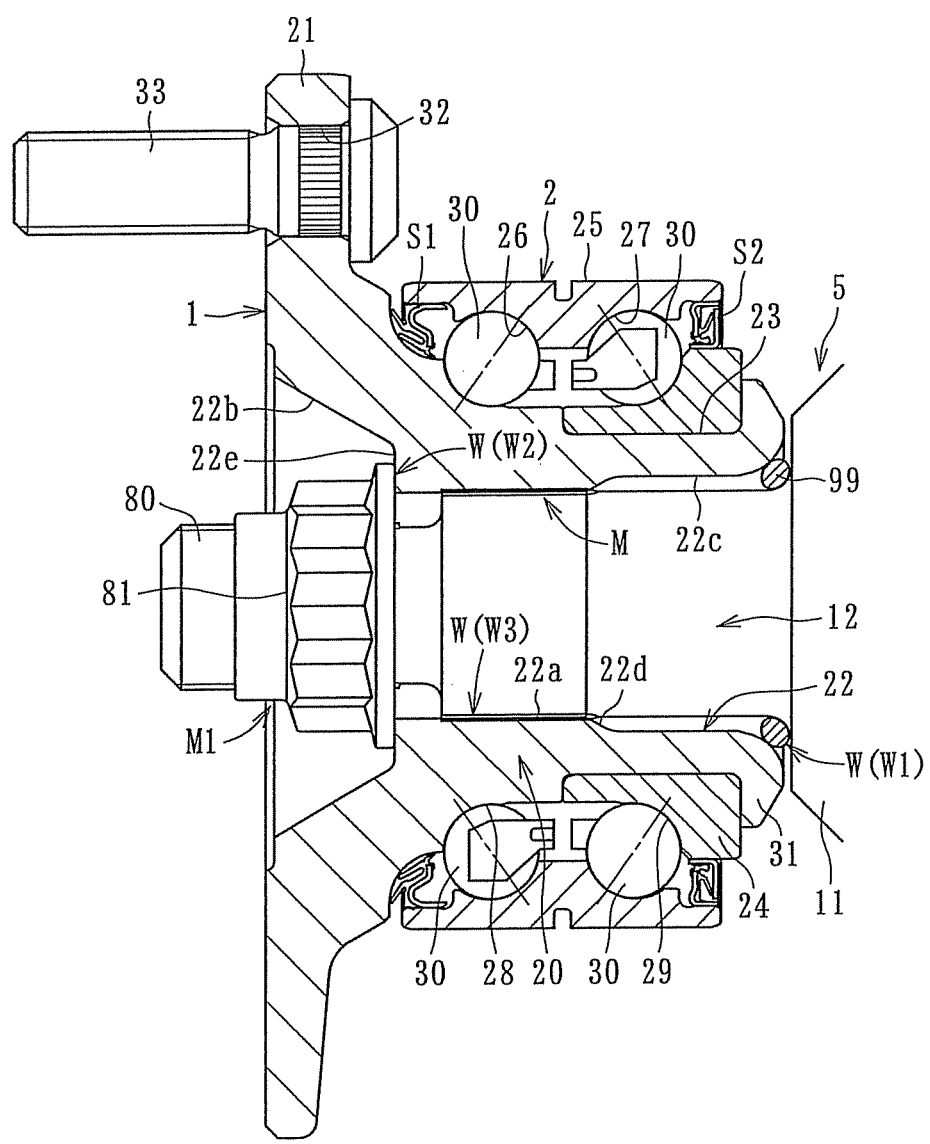
FIG. 24 is a sectional view of a bearing device for a wheel according to another embodiment.
Figure 25:
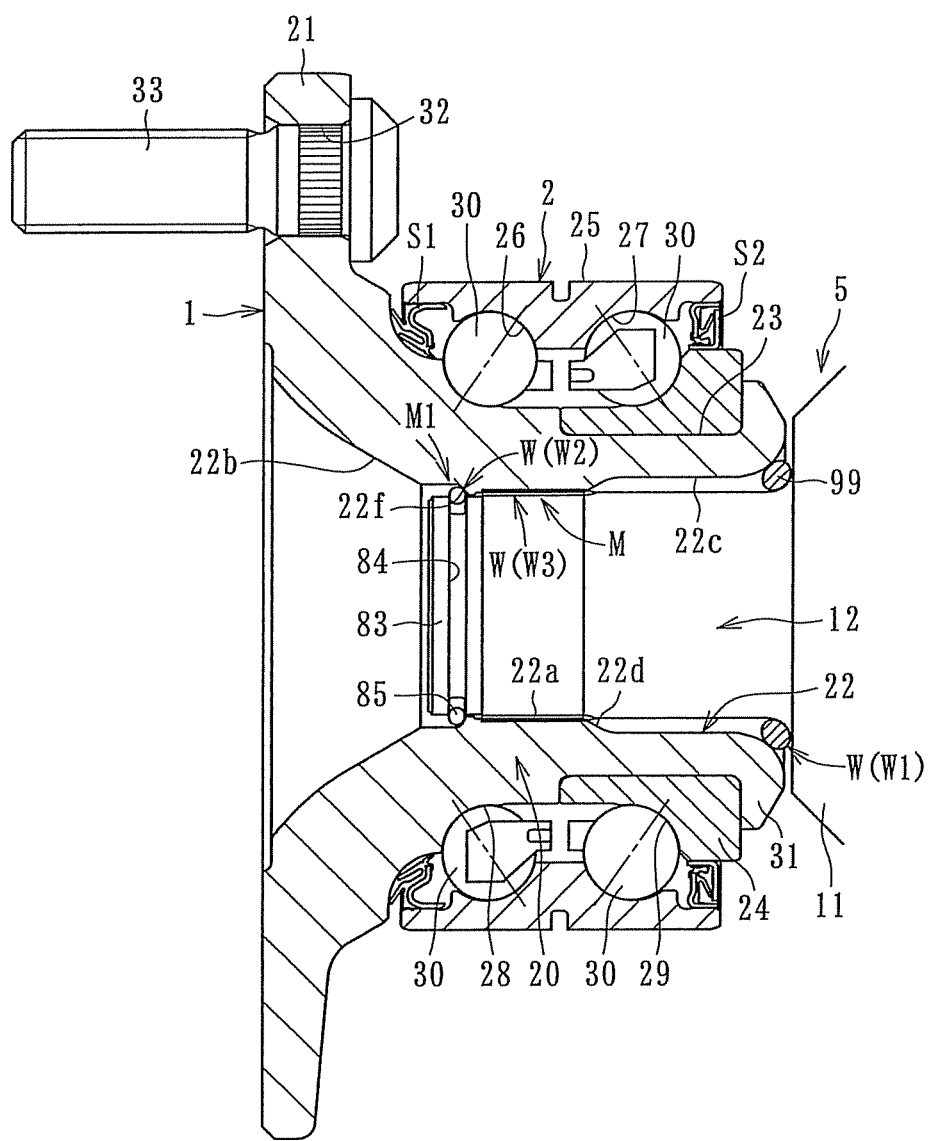
FIG. 25 is a sectional view of a bearing device for a wheel according to another embodiment.
Figure 26:
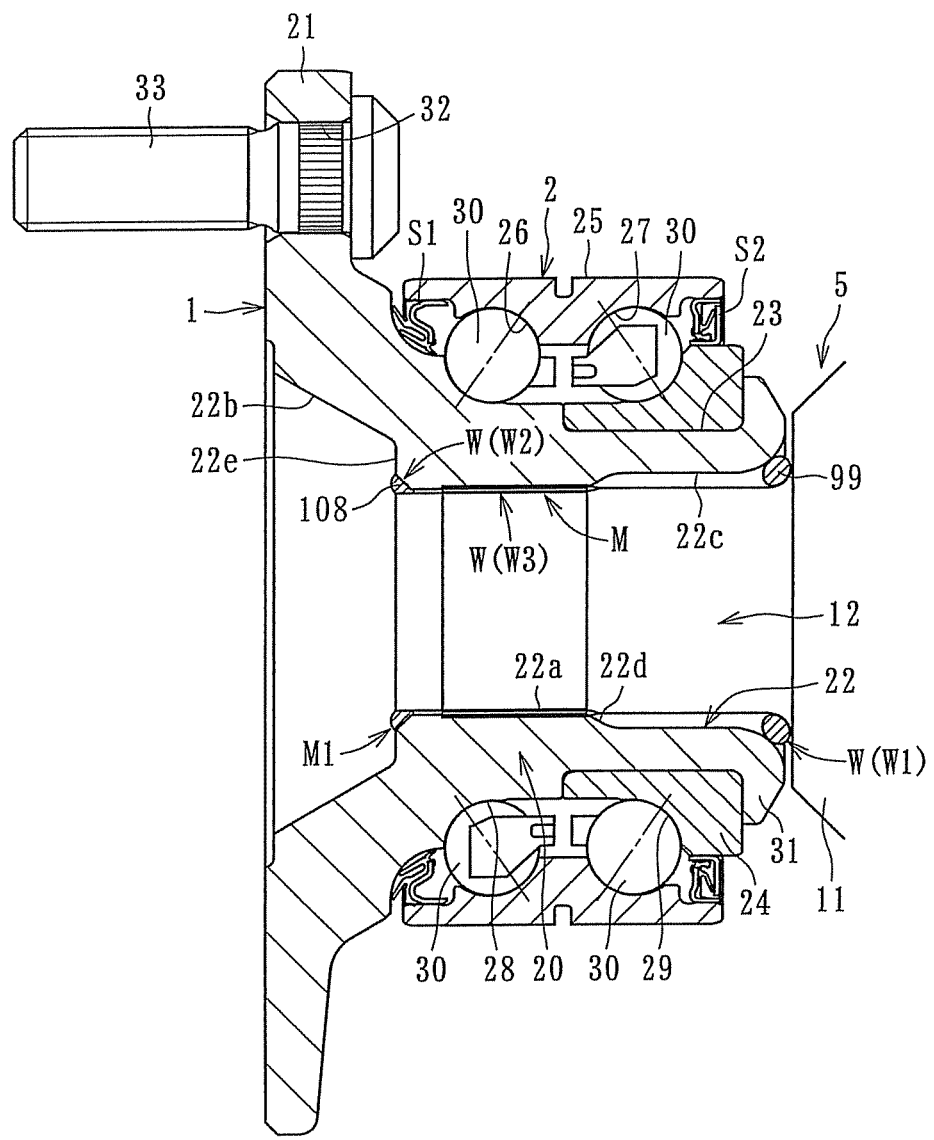
FIG. 26 is a sectional view of a bearing device for a wheel according to another embodiment.

FIGS. 24 through 26 illustrate other construction examples of the detachment prevention structure M1 of the shaft portion 12. Of those, FIG. 24 illustrates a detachment prevention structure M1 using bolt/nut connection. More specifically, a screw shaft portion 80 is continuously provided on the shaft portion 12. Further, a nut member 81 is screwed on the screw shaft portion 80, and is caused to abut the step surface 22*e* of the hole 22. In FIG. 25, the detachment prevention structure M1 for the shaft portion 12 is formed by a snap ring 85. In the structure illustrated in FIG. 25, a shaft extension 83 is provided on the out-board side with respect to the male spline 41, and a circumferential groove 84 is provided in the shaft extension 83, with the snap ring 85 being fitted into the circumferential groove 84. In FIG. 26, the detachment prevention structure M1 is formed by effecting welding between the outer peripheral surface of the shaft portion and the inner diameter surface of the hub. In the structure illustrated in FIG. 26, the out-board side portion of the outer peripheral surface of the shaft portion 12 and the out-board side opening end edge of the hole 22 of the hub 1 are bonded together by welding.

Figure 27:
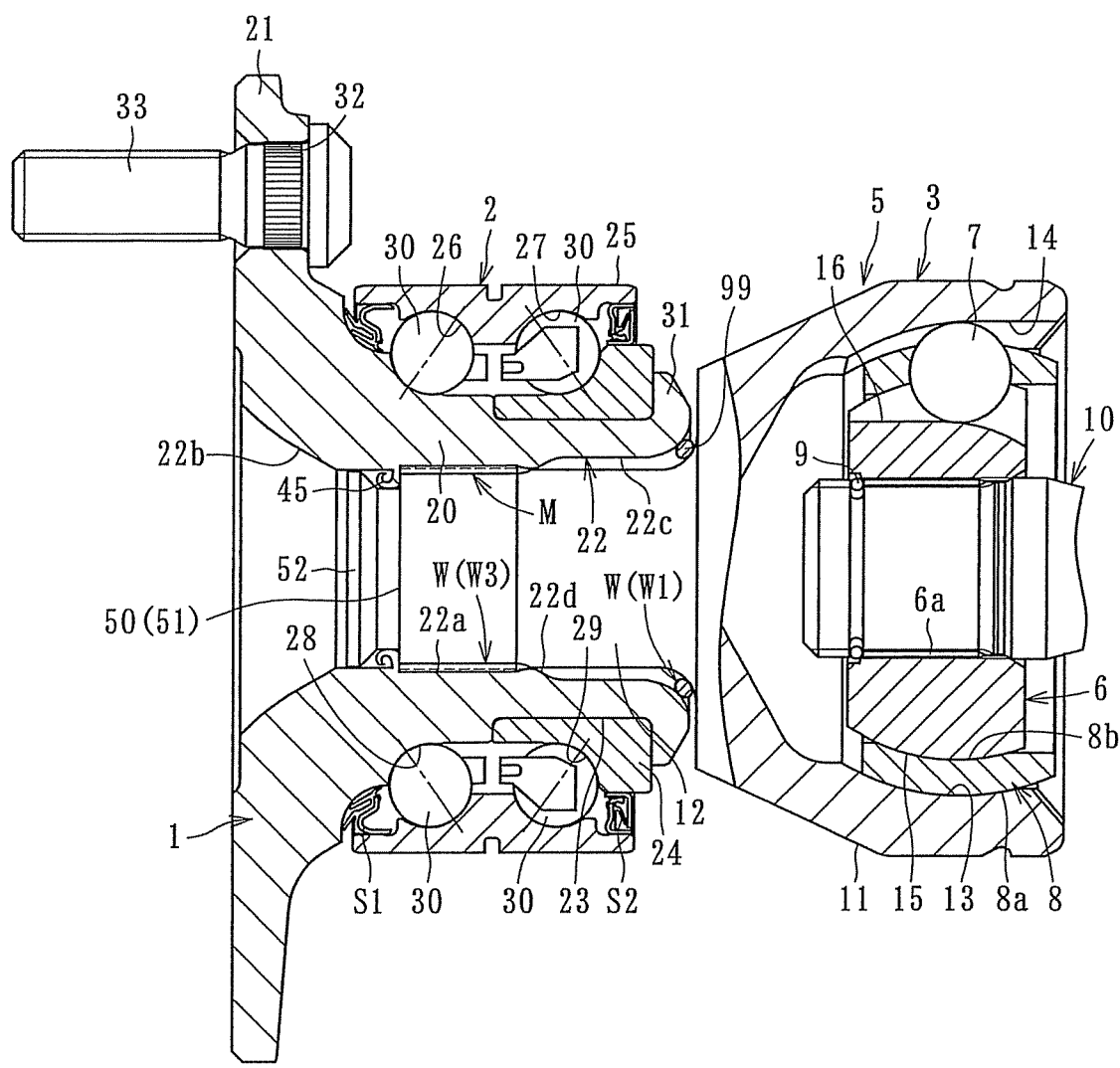
FIG. 27 is a sectional view of a bearing device for a wheel according to another embodiment.
Figure 28:
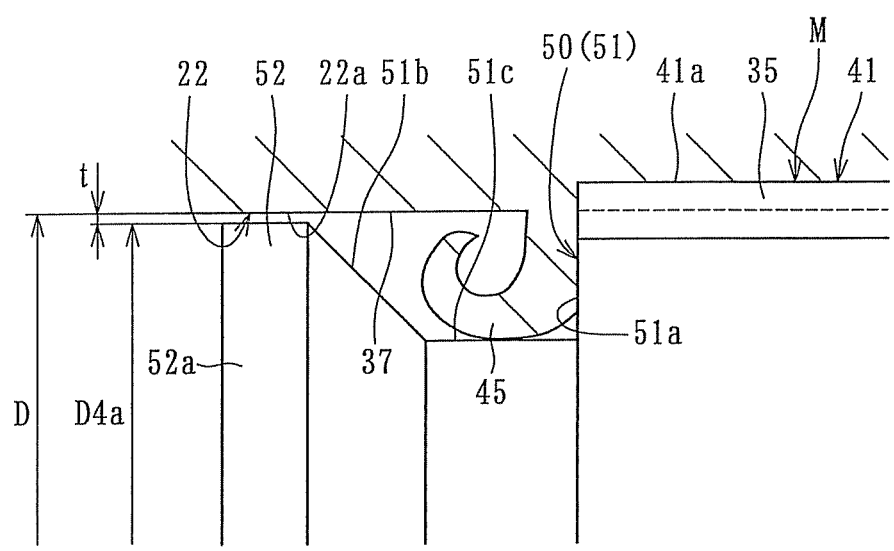
FIG. 28 is a main portion enlarged sectional view of the bearing device for a wheel of FIG. 27.

As illustrated in FIG. 27, the detachment prevention structure M1 for the shaft portion 12 may be omitted. In this case, as illustrated in FIG. 28, the male-spline-41-side side surface 51*a* of the circumferential groove 51 is a surface orthogonal to the axial direction, and the side surface 51*b* on the opposite side is a tapered surface diverging toward the out-board side from the groove bottom. 51*c*. On the out-board side with respect to the side surface 51*b* of the circumferential groove 51, there is provided a disc-like flange portion 52 for alignment.

When the outer diameter dimension of the flange portion 52 is larger than the hole diameter of the fit-engagement hole 22*a*, the flange portion 52 itself is press-fitted into the fit-engagement hole 22*a*. If, in this process, there is any decentering, the projections 35 are press-fitted as they are into the hub 1, and the shaft portion 1 and the hub 1 are connected together, with the axis of the shaft portion 12 and the axis of the hub 1 not being aligned with each other. In order to avoid this problem, the outer diameter dimension D4a of the flange portion 52 (see FIG. 28) is set slightly smaller than the hole diameter of the fit-engagement hole 22*a* of the hole 22, and a minute gap t is provided between the outer peripheral surface 52*a* of the flange portion 52 and the inner diameter surface of the fit-engagement hole 22*a* of the hole 22. On the other hand, when the outer diameter dimension of the flange portion 52 is excessively smaller than the hole diameter of the fit-engagement hole 22*a*, the alignment function cannot be obtained. Thus, it is desirable for the minute gap t between the outer peripheral surface 52*a* of the flange portion 52 and the inner diameter surface of the fit-engagement hole 22*a* of the hole 22 to be set to approximately 0.01 mm to 0.2 mm. The outer diameter dimension D4a of the flange portion 52 may be the same as the hole diameter of the fit-engagement hole 22*a*.

By thus providing on the out-board side of the pocket portion 50 the flange portion 52 for the alignment of the hub 1 with respect to the hole 22, no protruding portion 45 in the pocket portion 50 protrudes to the flange portion 52 side, making it possible to accommodate the protruding portion 45 in the pocket portion 50 more reliably. Further, the flange portion 52 has an aligning function, and hence it is possible to press-fit the shaft portion 12 into the hub 1 while preventing decentering. Thus, it is possible to connect the outer joint member 5 and the hub 1 together with high precision, thus allowing stable torque transmission.

Note that, in the bearing device for a wheel having no detachment prevention structure M1 illustrated in FIG. 27, it is also possible to omit the flange portion 52 provided on the shaft portion 12 for alignment.

Figure 30:
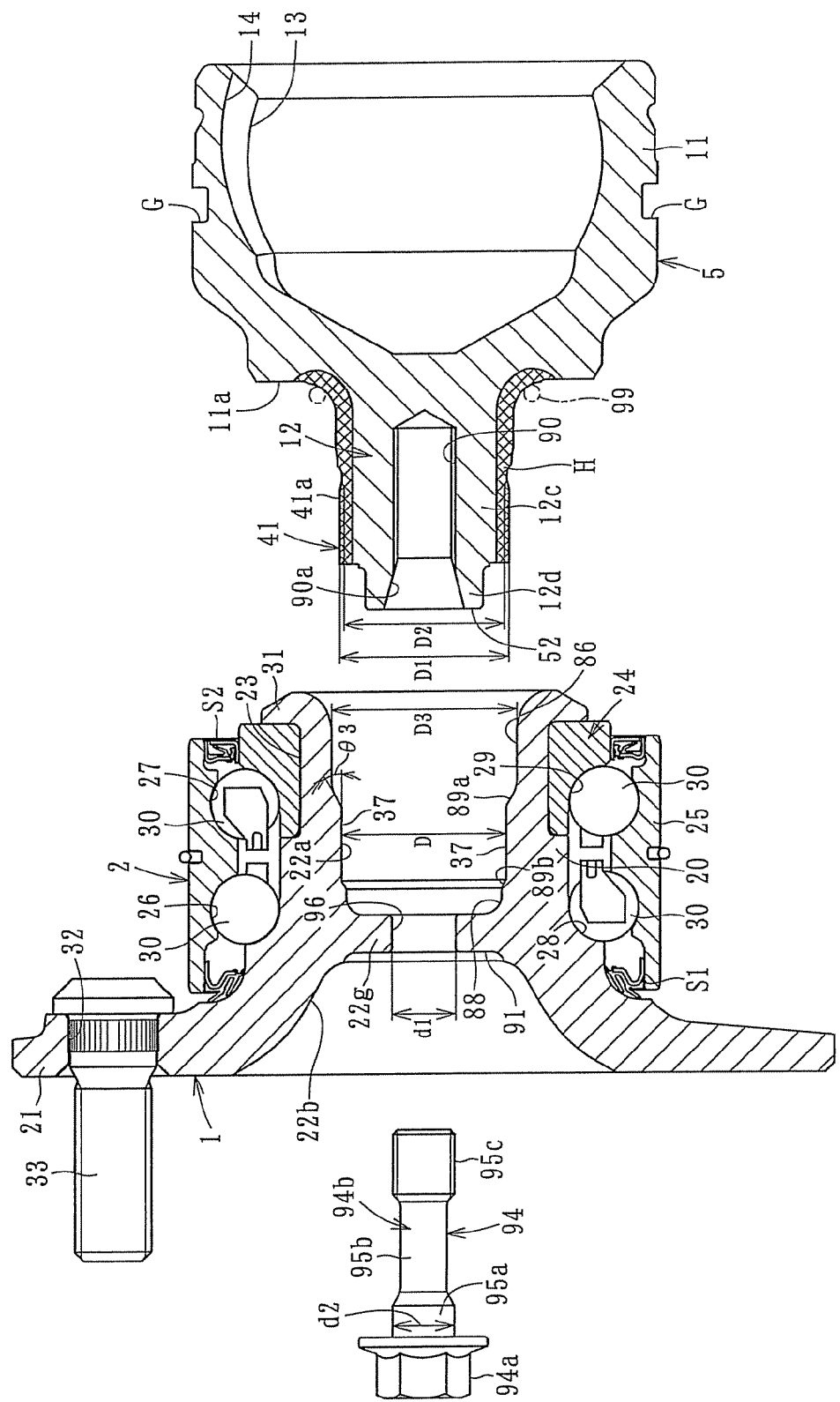
FIG. 30 is a sectional view of the bearing device for a wheel of FIG. 29 prior to the assembly thereof.

FIG. 29 illustrates an embodiment in which separation of the shaft portion 12 of the joint outer ring 5 and the hub 1 is allowed. As illustrated in FIGS. 29 and 30, in this embodiment, the hub 1 includes the cylindrical portion 20, and the flange 21 provided at the out-board side end portion of the cylindrical portion 20. The hole 22 of the cylindrical portion 20 includes the shaft portion fit-engagement hole 22*a* in the middle portion in the axial direction, and the tapered hole 22*b* on the out-board side, with an inwardly protruding inner wall 22*g* being provided between the shaft portion fit-engagement hole 22*a* and the tapered hole 22*b*. The shaft portion 12 of the joint outer ring 5 and the hub 1 are connected together through the intermediation of the recess/projection fit-engagement structure M. A recessed portion 91 is provided in the out-board side end surface of the inner wall 22*g*.

The hole 22 includes a large diameter portion 86 on the in-board side with respect to the shaft portion fit-engagement hole 22*a*, and a small diameter portion 88 on the out-board side with respect to the shaft portion fit-engagement hole 22*a*. A tapered portion (tapered hole) 89*a* is provided between the large diameter portion 86 and the shaft portion fit-engagement hole 22*a*. The tapered portion 89*a* is reduced in diameter in the press-fitting direction in which the hub 1 and the shaft portion 12 of the joint outer ring 5 are connected. The taper angle θ3 of the tapered portion 89*a* ranges, for example, from 15° to 75°. A tapered portion 89*b* is also provided between the shaft portion fit-engagement hole 22*a* and the small diameter portion 88.

In this embodiment, the recess/projection fit-engagement portion M is formed in the same way as described above. That is, the projections 35 are formed on the shaft portion 12, then the shaft portion 12 is press-fitted into the shaft portion fit-engagement hole 22*a* of the hub 1, and then the recesses 36 to be held in close fit-engagement with the projections 5 are formed in the inner diameter surface 37 of the shaft portion fit-engagement hole 22*a* of the hub 1.

After the press-fitting of the shaft portion 12, a bolt member 94 is screwed on a screw hole 90 of the shaft portion 12 from the out-board side. The bolt member 94 includes a flanged head portion 94*a* and a screw shaft portion 94*b*. The screw shaft portion 94*b* includes a large diameter proximal portion 95*a*, a small diameter main body portion 95*b*, and a screw portion 95*c* at the forward end. In this case, a through-hole 96 is provided in the inner wall 22*g*, and the shaft portion 94*b* of the bolt member 94 is inserted into the through-hole 96, with the screw portion 95*c* being screwed on the screw hole 90 of the shaft portion 12. As illustrated in FIG. 30, the hole diameter d1 of the through-hole 96 is set slightly larger than the outer diameter d2 of the large diameter proximal portion 95*a* of the shaft portion 94*b*. More specifically, the difference is approximately set to the range of 0.05 mm<d1−d2<0.5 mm. The maximum outer diameter of the screw portion 95*c* is approximately of a size that is the same as the outer diameter of the large diameter proximal portion 95*a* or slightly smaller than the outer diameter of the proximal portion 95*a*.

By screwing the bolt member 94 on the screw hole 90 of the shaft portion 12, a flange portion 100 of the head portion 94*a* of the bolt member 94 is held in contact with the recessed portion 91 of the inner wall 22*g*. As a result, the inner wall 22*g* is held between the out-board side end surface 92 of the shaft portion 12 and the head portion 94a of the bolt member 94, effecting positioning in the axial direction on the hub 1 and the joint outer ring 5. At the same time, a pocket portion 97 is formed in a space surrounded by the outer peripheral surface of the small diameter portion 12d of the shaft portion, the end surface of the inner wall 22g, and the small diameter portion 88 of the inner diameter surface of the hub 1.

While in FIG. 29 the inner wall 22g is held between the out-board side end surface 92 of the shaft portion 12 and the head portion 94a of the bolt member 94, it is not always necessary to hold the inner wall 22g. For example, it is possible to effect positioning of the hub 1 by the head portion 94a of the bolt member 94 and the recess/projection fit-engagement structure M. When the orbital-formed portion 31 of the hub 1 and the back surface 11a of the mouth portion 11 are held in contact with each other (see FIG. 43), the hub 1 may be held between the head portion 94a of the bolt member 94 and the back surface 11a of the mouth portion 11. This helps to achieve an improvement in the bending rigidity in the axial direction and in bending resistance, making it possible to provide a high quality bearing device for a wheel superior in durability. Further, due to this contact, it is also possible to effect positioning on the hub 1 at the time of press-fitting, and hence it is possible to stabilize the dimensional accuracy of the bearing device for a wheel and to stabilize the axial length of the recess/projection fit-engagement structure M, making it possible to achieve an improvement in terms of torque transmission property. Further, due to this contact, it is possible to form a seal structure, and hence it is possible to prevent intrusion of foreign matter from the orbital-formed portion 31 side and to maintain the fit-engagement state of the recess/projection fit-engagement structure M for a long period of time in a stable manner.

Figure 44:
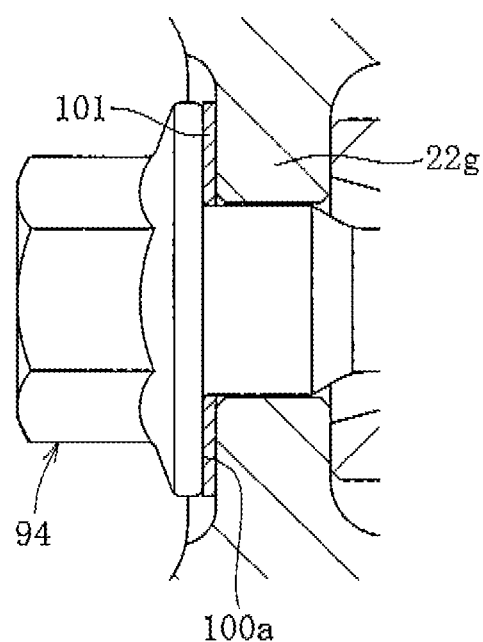
FIG. 44 is a sectional view of a seal material provided between a bolt member and an inner wall.

By providing a seal material 101, as illustrated in FIG. 44, between the bearing surface 100a of the bolt member 94 and the inner wall 22g, it is possible to secure sealing property between the bearing surface 100a and the bottom surface of the recessed portion 91 of the inner wall 22g. As a result, it is possible to prevent intrusion of rainwater and foreign matter into the recess/projection fit-engagement structure M from the out-board side. As the seal material 101, the seal material 101 is selected from among various resins and applied so that the sealing property may be secured.

Figure 31:
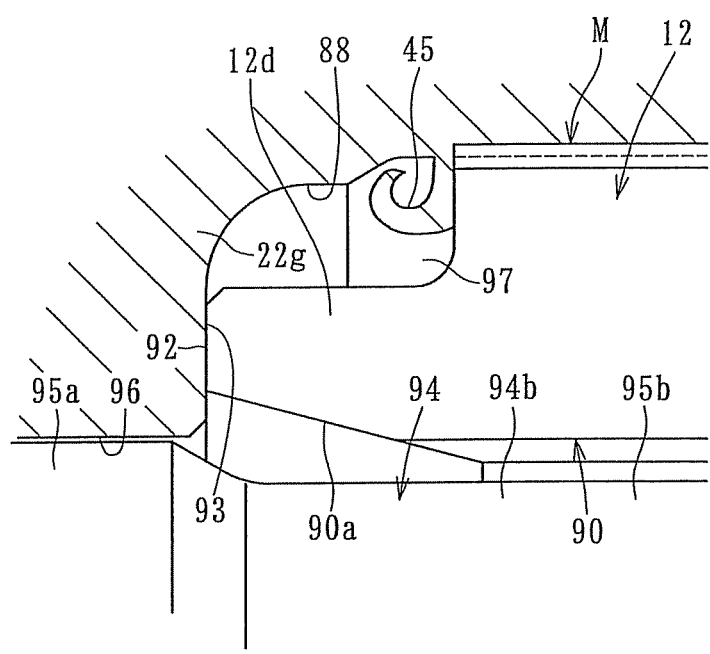
FIG. 31 is a main portion enlarged sectional view of the bearing device for a wheel of FIG. 29.

When the shaft portion 12 is press-fitted into the hole 22 of the hub 1, the material scraped off or pushed out of the inner diameter surface of the hole 22 by the projections 35 constitutes a protruding portion 45, which is accommodated in a curled state, as illustrated in FIG. 31, in a pocket portion 97 provided on the outer side of the small diameter portion 12d of the shaft portion 12. In this way, by providing the pocket portion 97 for accommodating the protruding portion 45, it is possible to retain (maintain) the protruding portion 45 in the pocket portion 97, and there is no fear of the protruding portion 45 entering the interior of the vehicle, etc. outside the device. As a result, it is possible to keep the protruding portion 45 to be accommodated in the pocket portion 97. Further, there is no need to perform the processing to remove the protruding portion 45, and it is possible to attain an improvement in assembly workability and a reduction in cost through a reduction in the assembly operation man-hours.

Figure 32:
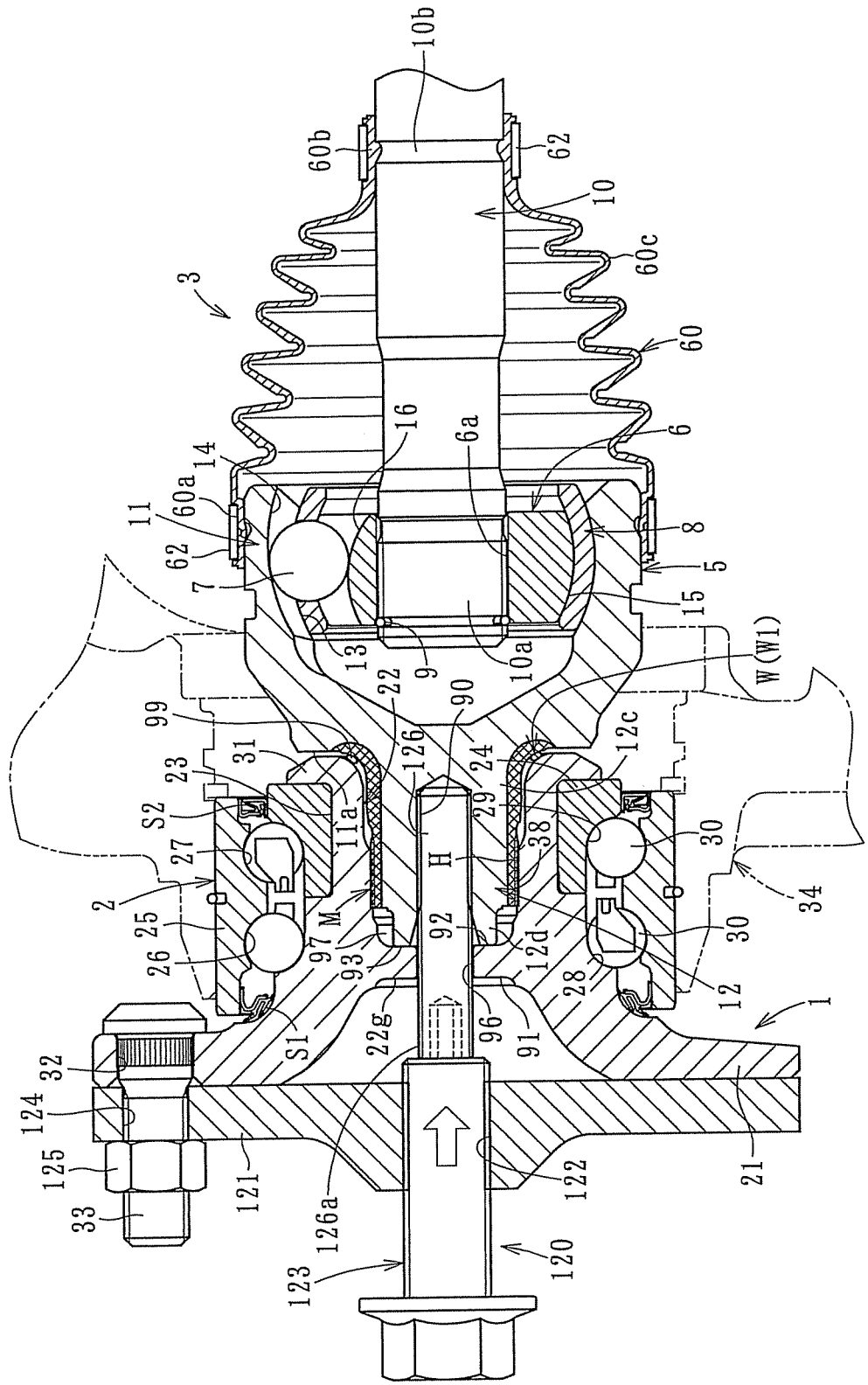
FIG. 32 is a sectional view illustrating a separation process for the recess/projection fit-engagement structure of the bearing device for a wheel of FIG. 29.

When separating the joint outer ring 5 and the hub 1 from each other, the bolt member 94 is removed in the state illustrated in FIG. 29, and then a drawing force not smaller than the fit-engagement force of the recess/projection fit-engagement structure Misapplied between the hub 1 and the joint outer ring 5 to thereby draw the joint outer ring 5 from the hub 1. This drawing can be affected by using a jig 120 as illustrated in FIG. 32. The jig 120 includes a base disc 121, a pressing bolt member 123 screwed on a screw hole 122 of the base disc 121, and a screw shaft 126 threadedly engaged with a screw hole 90 of the shaft portion 12. The base disc 121 is provided with a through-hole 124, through which the bolt 33 of the hub 1 is inserted, with a nut member 125 being threadedly engaged with the bolt 33. In this process, the base disc 121 and the flange 21 of the hub 1 are superimposed one upon the other, and the base disc 121 is mounted to the hub 1.

In this way, after the base disc 121 has been mounted to the hub 1, the screw shaft 126 is screwed on the screw hole 90 of the shaft portion 12 so that a base portion 126a may protrude to the out-board side from the inner wall 22g. The protruding amount of the base portion 126a is set larger than the axial length of the recess/projection fit-engagement structure M. The screw shaft 126 and the pressing bolt member 123 are arranged in the same axis.

After this, as illustrated in FIG. 32, the pressing bolt member 123 is screwed on the screw hole 122 of the base disc 121 from the out-board side, and in this state, the bolt member 123 is caused to threadedly advance in the direction of the arrow. In this process, because the screw shaft 126 and the pressing bolt member 123 are arranged in the same axis, the bolt member 123 presses the screw shaft 126 to the in-board side. This causes the joint outer ring 5 to move toward the in-board side with respect to the hub 1, and the hub 1 is removed from the joint outer ring 5.

Further, in the state in which the joint outer ring 5 has been removed from the hub 1, it is possible to connect the hub 1 and the joint outer ring 5 together again by using, for example, the bolt member 94 illustrated in FIG. 30. That is, the base disc 121 is removed from the hub 1, and the screw shaft 126 is removed from the shaft portion 12. In this state, the bolt member 94 is screwed on the screw hole 90 of the shaft portion 12 through the through-hole 96. In this state, phase matching is effected between the male spline 41 on the shaft portion 12 side and the female spline 42 of the hub 1 formed by the previous press-fitting.

Figure 33:
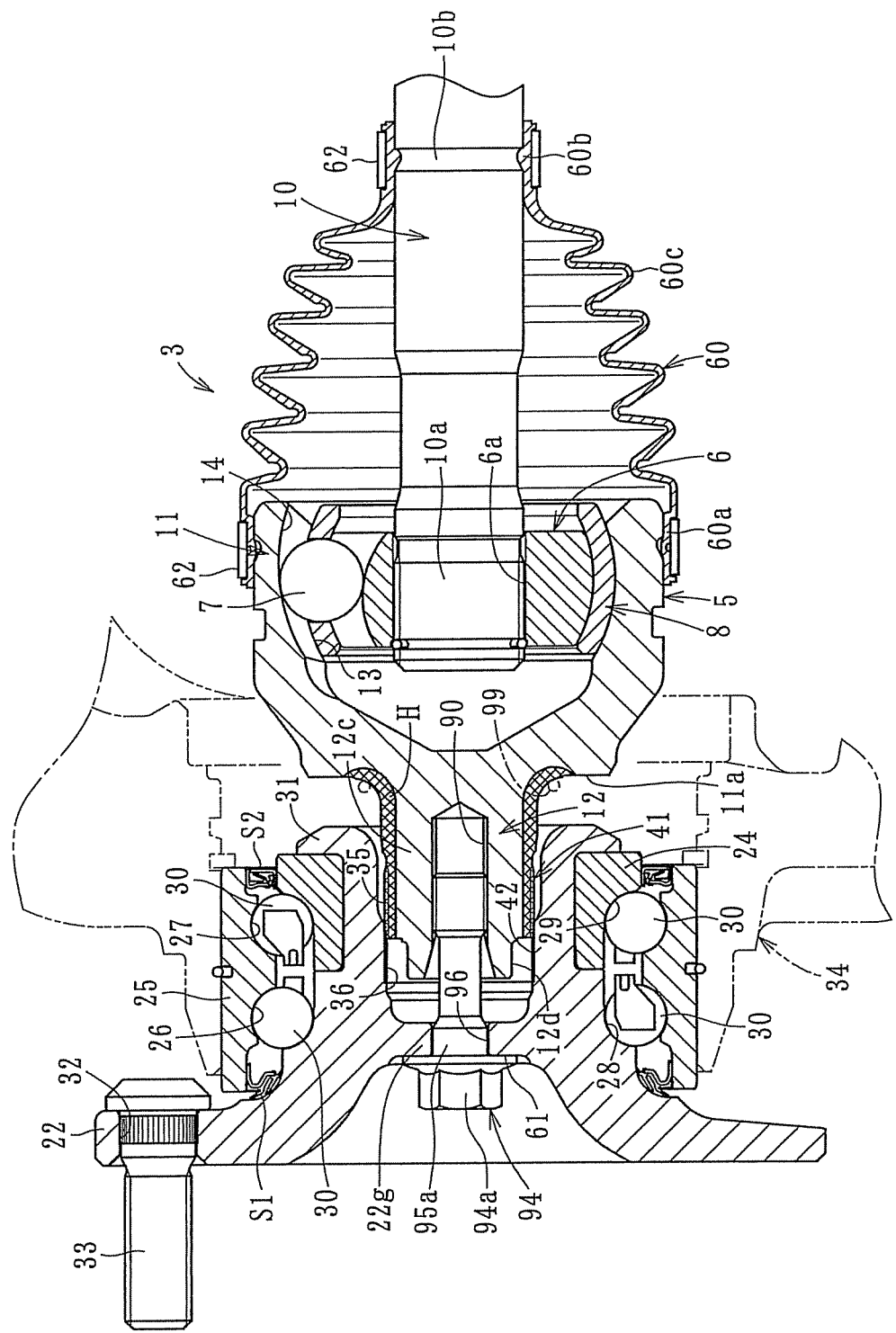
FIG. 33 is a sectional view illustrating a re-press-fitting process for the bearing device for a wheel of FIG. 29.

Next, in this state, the bolt member 94 is caused to threadedly advance with respect to the screw hole 90. As a result, the shaft portion 12 is gradually fitted into the hub 1. In this process, the hole 22 is slightly diverged to allow axial intrusion of the shaft portion 12. When the axial movement is stopped, the hole 22 tends to be restored to the original diameter, and is reduced in diameter. As a result, as in the previous press-fitting, there is formed again the recess/projection fit-engagement structure M in which the entire fit-engagement portions of the projections 35 with the recesses are held in close contact with the corresponding recesses 36, thus re-connecting the joint outer ring 5 and the hub 1. As illustrated in FIGS. 32 and 33, the separation and re-connection of the hub 1 and the joint outer ring 5 as described above can be effected, with the outer member 25 of the bearing 2 being mounted to the knuckle of the vehicle.

In particular, as illustrated in FIG. 33, when causing the bolt member 94 to threadedly advance with respect to the screw hole 90, the base portion 95a of the bolt member 94 is in correspondence with the through-hole 96. Further, as illustrated in FIG. 30, the hole diameter d1 of the through-hole 96 is set slightly larger than the outer diameter d2 of the large diameter base portion 95a of the shaft portion 94b (more specifically, the difference is approximately in the range of 0.05 mm<d1−d2<0.5 mm), and hence the outer diameter of the base portion 95a of the bolt member 94 and the inner diameter of the through-hole 96 can constitute a guide when the bolt member 94 threadedly advances through the screw hole 90, making it possible to press-fit the shaft portion 12 into the hole 22 of the hub 1 without involving any decentering. When the axial length of the through-hole 96 is too small, a stable guide function cannot be exerted. On the other hand, when it is too large, the thickness dimension of the inner wall 22g is rather large, and hence the requisite axial length of the recess/projection fit-engagement structure M cannot be secured, and the weight of the hub 1 is rather large. The length of the through-hole 96 is determined taking into consideration the above-mentioned factors.

As illustrated in FIG. 31, when there is formed at the opening of the screw hole 90 of the shaft portion 12 a tapered portion 90a diverging toward the opening, the screw shaft 126 and the bolt member 94 can be easily screwed on the screw hole 90.

In the first press-fitting (press-fitting by which the recesses 36 are formed in the inner diameter surface 37 of the hole 22), the press-fit load is relatively large, and hence, when press-fitting the shaft portion 12, it is necessary to use a pressing machine or the like. In contrast, when performing the press-fitting as described above again, the press-fit load is smaller than that in the first press-fitting, and hence it is possible to press-fit the shaft portion 12 into the hole 22 of the hub 1 accurately in a stable manner. Thus, it is possible to effect separation and connection of the joint outer ring 5 and the hub 1 in the field.

In the male spline 41 illustrated in FIG. 2, the pitch of the projections 35 and the pitch of the recesses 36 are set to the same value by way of example. Thus, as illustrated in FIG. 2B, in the middle portions in the height direction of the projections 35, the circumferential thickness L of the projections 35 and the width L0 of the grooves between the adjacent projections are substantially the same.

Figure 34A:
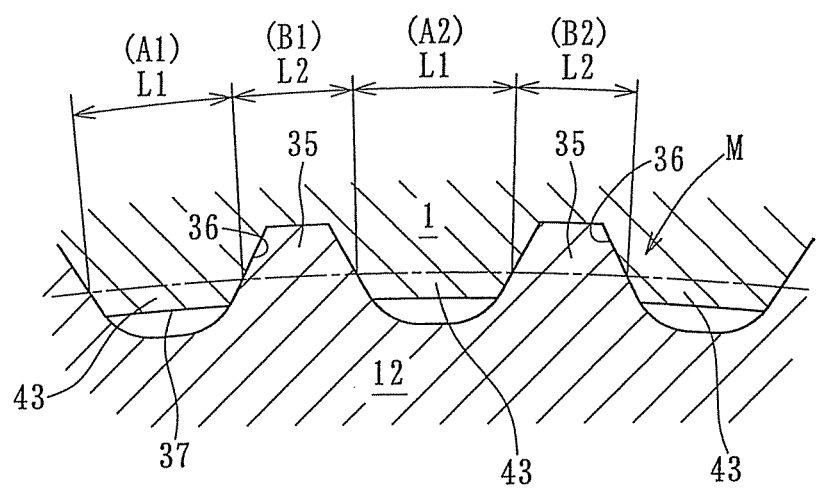
FIG. 34A is a sectional view of another example of projections of the recess/projection fit-engagement structure.

Meanwhile, as illustrated in FIG. 34A, in the middle portions in the height direction of the projections 35, the circumferential thickness L2 of the projections 35 may be smaller than the width L1 of the grooves between the adjacent projections. In other words, in the middle portions in the height direction of the projections 35, the circumferential thickness (tooth thickness) L2 of the projections 35 on the shaft portion 12 side is set smaller than the circumferential thickness (tooth thickness) L1 of the projections 43 on the hub 1 side.

By satisfying the above-mentioned relationship in the projections 35, it is possible to set the sum total of the circumferential thicknesses L2 of the projections 35 on the shaft portion 12 side, $\Sigma(B1+B2+B3+ \ldots )$, smaller than the sum total of the circumferential thicknesses of the projections 43 on the hub 1 side, $\Sigma(A1+A2+A3+ \ldots )$. As a result, it is possible to enlarge the shear plane area of the projections 43 on the hub 1 side, making it possible to secure the requisite torsional strength. Further, because the tooth thickness of the projections 35 is small, the press-fit load can be small, making it possible to achieve an improvement in terms of press-fitting property.

In this case, it is not necessary for the relationship of L2<L1 to be satisfied with respect to all the projections 35 and 43. Regarding a part of the projections 35 and 43, setting can be made such that L2=L1 or that L2>L1 as long as the sum total of the circumferential thicknesses is smaller than the sum total of the circumferential thicknesses of the projections 43 on the hub 1 side.

Figure 34B:
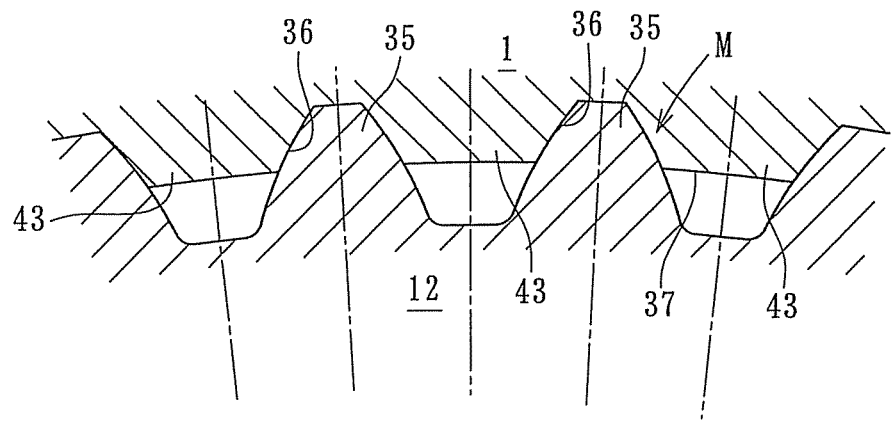
FIG. 34B is a sectional view of another example of projections of the recess/projection fit-engagement structure.

While in FIG. 34A the projections 35 have a trapezoidal sectional shape, it is also possible for the projections to have an involute sectional shape as illustrated in FIG. 34B.

Figure 35A:
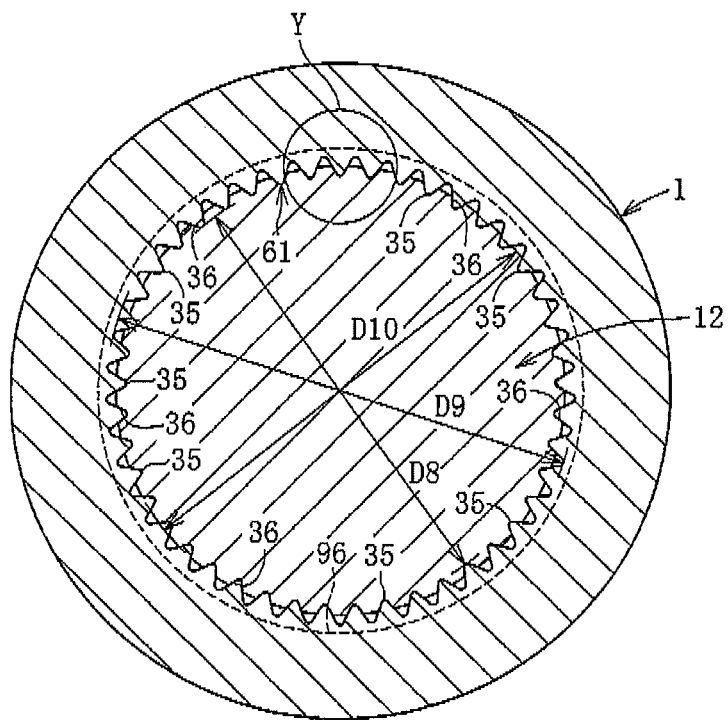
FIG. 35A is a sectional view of another example of the recess/projection fit-engagement structure.
Figure 35B:
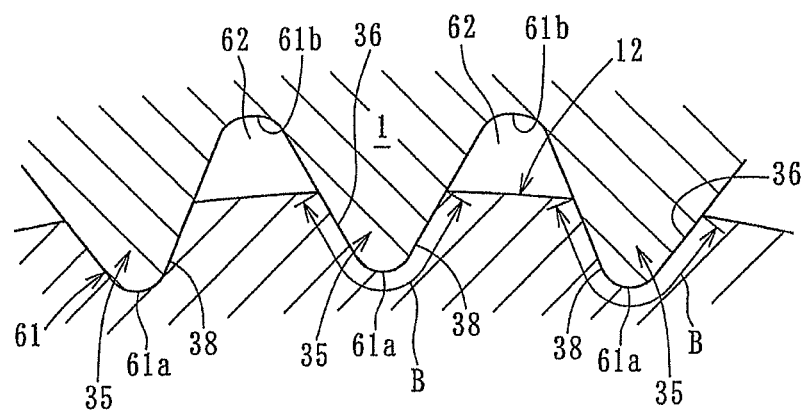
FIG. 35B is an enlarged view of portion Y of FIG. 35A.

While in the embodiments described above the projections 35 are formed on the shaft portion side by forming the male spline 41 on the shaft portion 12, it is also possible, as illustrated in FIGS. 35A and 35B, to form the projections 35 on the hub 1 side by forming a female spline 61 on the inner diameter surface of the hole 22 of the hub 1. As in the case in which the male spline 41 is formed on the shaft portion 12, in this case, the hardness of the projections 35 of the hub 1 higher than that of the outer peripheral surface of the shaft portion by 20 points or more in HRC by, for example, performing thermal hardening on the female spline 61 of the hub 1 and leaving the outer peripheral surface of the shaft portion 12 in an unquenched state. The female spline 61 can be formed by various well-known machining methods, such as broaching, cutting, press working, and drawing. As the thermal hardening method, it is possible to adopt various heat treatments such as induction quenching and carburizing and quenching. The press-fitting start side end surface edges of the projections 35 are formed as corner portions 39 devoid of roundness.

After this, the shaft portion 12 is press-fitted into the hole 22 of the hub 1. Then, the recesses 36 to be fit-engaged with the projections 35 are formed in the outer peripheral surface of the shaft portion 12 by the projections 35 on the hub 1 side, whereby there is formed the recess/projection fit-engagement structure M in which the entire fit-engagement portions of the projections 35 and the recesses 36 are held in close contact with each other. The fit-engagement portion 38 of the projections 35 and the recesses 36 corresponds to the ranges B in FIG. 35B. Clearances 62 are formed on the outer side of the outer peripheral surface of the shaft portion 12 and between the circumferentially adjacent projections 35.

Figure 36:
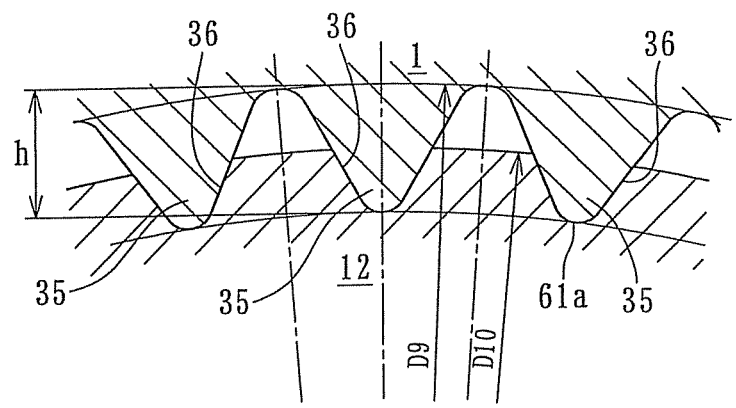
FIG. 36 is an enlarged sectional view of the recess/projection fit-engagement structure illustrated in FIG. 35A.

The middle portions in the height direction of the projections 35 correspond to the position of the outer peripheral surface of the shaft portion 12 before the formation of the recesses. That is, the outer diameter dimension D10 of the shaft portion 12 is set larger than the minimum inner diameter dimension D8 of the projections 35 of the female spline 61 (diameter dimension of the circumcircle passing the tooth tips 61a of the female spline 61) and smaller than the maximum inner diameter dimension D9 of the female spline 61 (diameter dimension of the circle connecting the tooth bottoms 6a of the female spline 61) (D8<D10<D9). Further, as illustrated in FIG. 36, the press-fitting margin $\Delta d$ of the projections 35 with respect to the shaft portion 12 and the height h of the projections are set to the range: $0.3<\Delta d/2 h<0.86$. In this case, as illustrated in FIGS. 35A and 36, the press-fitting margin $\Delta d$ can be expressed as the difference in diameter (D10-D8) between the outer diameter dimension D10 of the shaft portion 12 and the minimum inner diameter dimension D8 of the hub (diameter of the circle passing the tooth tips 61a of the projections 35). As a result, the middle portions in the height direction of the projections 35 are engaged in the outer peripheral surface of the shaft portion 12, and hence the pressing-in margin for the projections 35 can be secured to a sufficient degree, making it possible to reliably form the recesses 36.

In this case also, the protruding portion 45 is formed by press-fitting, and hence it is desirable to provide the pocket portion 97 for accommodating the protruding portion 45. The protruding portion 45 is formed on the in-board side of the shaft portion 12, and hence the pocket portion is provided on the in-board side of the recess/projection fit-engagement structure M and on the hub 1 side.

In this way, in the case in which the projections 35 of the recess/projection fit-engagement structure M are provided on the inner diameter surface of the hole 22 of the hub 1, there is no need to effect thermal hardening on the shaft portion 12 side, and hence it is advantageously possible to attain superior productivity for the joint outer ring 5 of the constant velocity universal joint 3.

The present invention is not restricted to the embodiments described above but allows various modifications. For example, as the sectional shape of the projections 35 of the recess/projection fit-engagement structure M, it is possible to adopt, apart from the shape illustrated in FIGS. 2, 34A, and 35B, various sectional shapes such as semi-circular, semi-elliptical, and rectangular sectional shapes. The area, number, circumferential arrangement pitch, etc. of the projections 35 can be arbitrarily changed. The projections 35 can be formed by keys or the like separate from the shaft portion 12 and the hub 11.

Further, the hole 22 of the hub 1 may be a modified hole such as a polygonal hole other than a circular hole, and the sectional shape of the end portion of the shaft portion 12 fitted into the hole 22 may be of a modified sectional shape such as a polygonal sectional shape other than the circular one. Further, when press-fitting the shaft portion 12 into the hub 1, it is only necessary for the hardness of the end portion region including at least the press-fitting start side end surfaces of the projections 35 to be higher than the hardness of the side where press-fitting is effected, and it is not always necessary to enhance the hardness of the entire projections 35. While in FIGS. 2B and 35B the clearances 40, 62 are formed between the spline tooth bottoms and the member in which the recesses 36 are formed, it is also possible for the entire grooves between the projections 35 to be filled with the mating members.

It is also possible to previously provide small recesses arranged at a predetermined circumferential pitch in the recess formation surface of the member in which the recesses are to be formed. It is necessary for the small recesses to have a volume smaller than that of the recesses 36. By thus providing small recesses, it is possible to reduce the volume of the protruding portion 45 formed at the time of pressing-in of the projections 35, and hence it is possible to reduce the press-fitting resistance. Further, since the protruding portion 45 can be made smaller, it is possible to reduce the volume of the pocket portion 50, making it possible to improve the workability of the pocket portion 50 and the strength of the shaft portion 12. The small recesses may be of various shapes such as a triangular, a semi-elliptical, or a rectangular shape, and the number of small recess can also be set arbitrarily.

While welding is adopted as the connection means illustrated in FIG. 26, it is also possible to adopt adhesive instead of welding. Further, instead of balls, it is also possible to use rollers as the rolling elements 30 of the bearing 2. Further, while in the above-mentioned embodiment the present invention is applied to the third generation bearing device for a wheel, it is also applicable to the first, second, or further fourth generation bearing device for a wheel. When press-fitting the projections 35, it is possible to move the member on which the projections 35 are formed, with the member in which the recesses 36 are formed being stationary. Conversely, it is also possible to move the member in which the recesses 36 are formed, with the member on which the projections 35 are formed being stationary. Further, it is also possible to move both of them. In the constant velocity universal joint 3, the inner ring 6 and the shaft 10 may be integrated with each other through the intermediation of the recess/projection fit-engagement structure M as described with reference to the above embodiments.

In the detachment prevention structure M1 for the shaft portion 12, when, for example, the snap ring 85 illustrated in FIG. 25 is used, it is also possible to provide the detachment prevention structure M1 on the proximal portion side (mouth side) of the shaft portion 12 instead of providing it at the end of the shaft portion 12.

In the embodiment illustrated in FIG. 29, the seal material provided between the bearing surface 100a of the bolt member 94 for bolt fixation of the hub 1 and the shaft portion 12 and the inner wall 22g may be resin which is applied to the bearing surface 100a side of the bolt member 94 or, conversely, to the inner wall 22g side. It is also possible to apply resin to both the bearing surface 100a side and the inner wall 22g side. If, when screwing bolt member 94, superior adherence can be attained between the bearing surface 100a of the bolt member 94 and the bottom surface of the recessed portion 91 of the inner wall 22g, it is also possible to omit such a seal material. For example, by performing cutting on the bottom surface of the recessed portion 91, it is possible to achieve an improvement in terms of adherence with the bearing surface 100a of the bolt member 94, and hence it is possible to omit application of the seal material. As long as the requisite adherence is secured, it is possible to omit cutting of the recessed portion 91, leaving a forged surface or a turning finish state as it is.

There are no limitations regarding the shape of the pocket portion 50 as long as it can accommodate the generated protruding portion 45. The volume of the pocket portion 50 is at least larger than the generation amount of the protruding portion 45 to be expected. Further, as illustrated in FIG. 35A, the hole 22 of the hub 1 can be provided with a pocket portion 96 to accommodate the protruding portion 45.

EXAMPLES

Example 1

Figure 37:
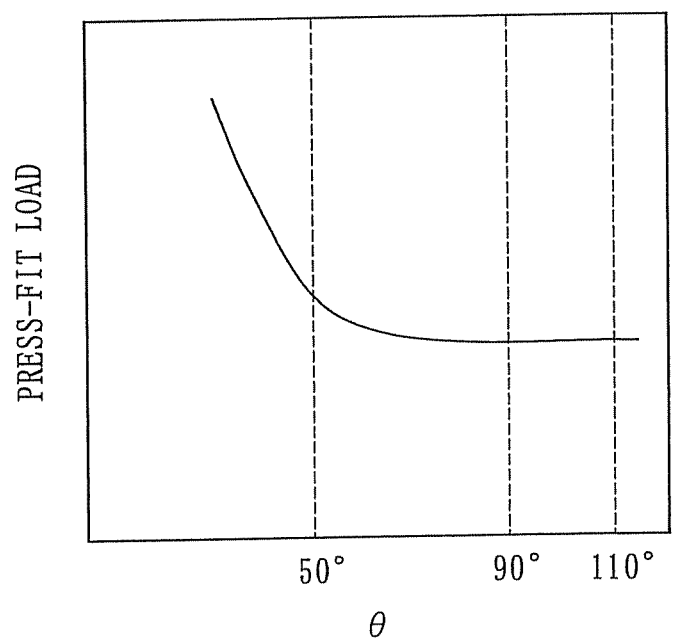
FIG. 37 is a graph illustrating results of press-fit load measurement when the crossing angle θ1 is varied.

A male spline of a module of 0.48 and having 58 teeth was formed on the shaft portion 12, and measurement was performed on the press-fit load when the crossing angle θ1, which is an angle made by the press-fitting start side end surfaces 35a of the projections 35 and the axis, was varied. Further, the formability of the recess/projection fit-engagement structure M when the crossing angle θ1 was varied was evaluated. FIG. 37 illustrates the press-fit load measurement results, and FIG. 41 illustrates the formability evaluation results.

As can be seen from FIG. 37, when the crossing angle θ is smaller than 50°, the press-fit load is large. When the crossing angle θ is larger than 110°, a crack is likely to be generated at the spline end surface. When the crack is generated, the formability of the recess/projection fit-engagement structure M deteriorates abruptly, resulting in an increase in press-fit load.

Further, as is apparent from FIG. 41, also regarding the formability of the recess/projection fit-engagement structure, it was satisfactory in the examples in which the crossing angle θ1 was in the range of 50° to 110°. In contrast, in the examples in which the crossing angle was smaller than 50°, e.g., 31° or 46°, the formability deteriorated, and, in the example in which the crossing angle was 112°, which is in excess of 110°, spline crack was generated. Here, the term deterioration means a fit-engagement structure that fails to provide the following effect: "due to the close contact of the projections and the recesses over the entire fit-engagement contact region, there is formed no gap which generates play in the radial direction or the circumferential direction."

Example 2

Figure 38:
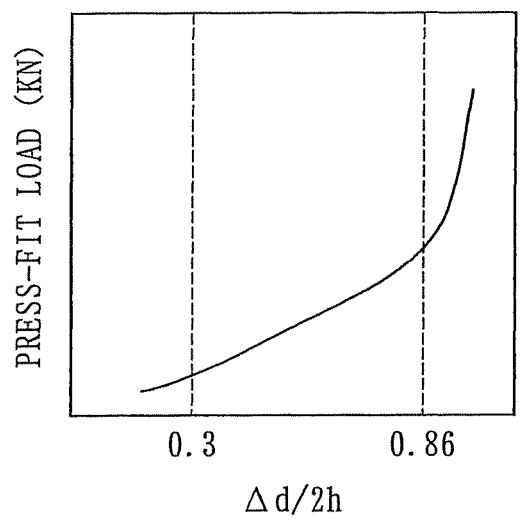
FIG. 38 is a graph illustrating results of press-fit load measurement when Δd/2 h is varied.

A male spline 41 of a module of 0.48 and having 59 teeth was formed on the shaft portion 12, and the press-fit load was measured, with Δd/2 h being varied. Further, torsional strength test was conducted on each recess/projection fit-engagement structure, and the formability thereof was evaluated. FIG. 38 illustrates press-fit load measurement results, FIG. 39 illustrates the torsional strength test results, and FIG. 42 illustrates the recess/projection fit-engagement structure formability evaluation results.

Figure 39:
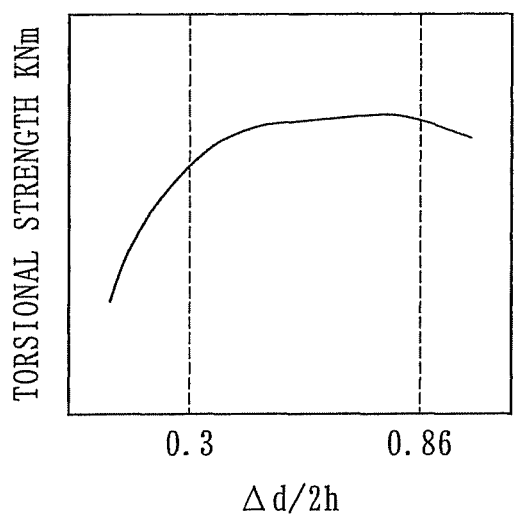
FIG. 39 is a graph illustrating results of torsional strength measurement when Δd/2 h is varied.
Figure 40:
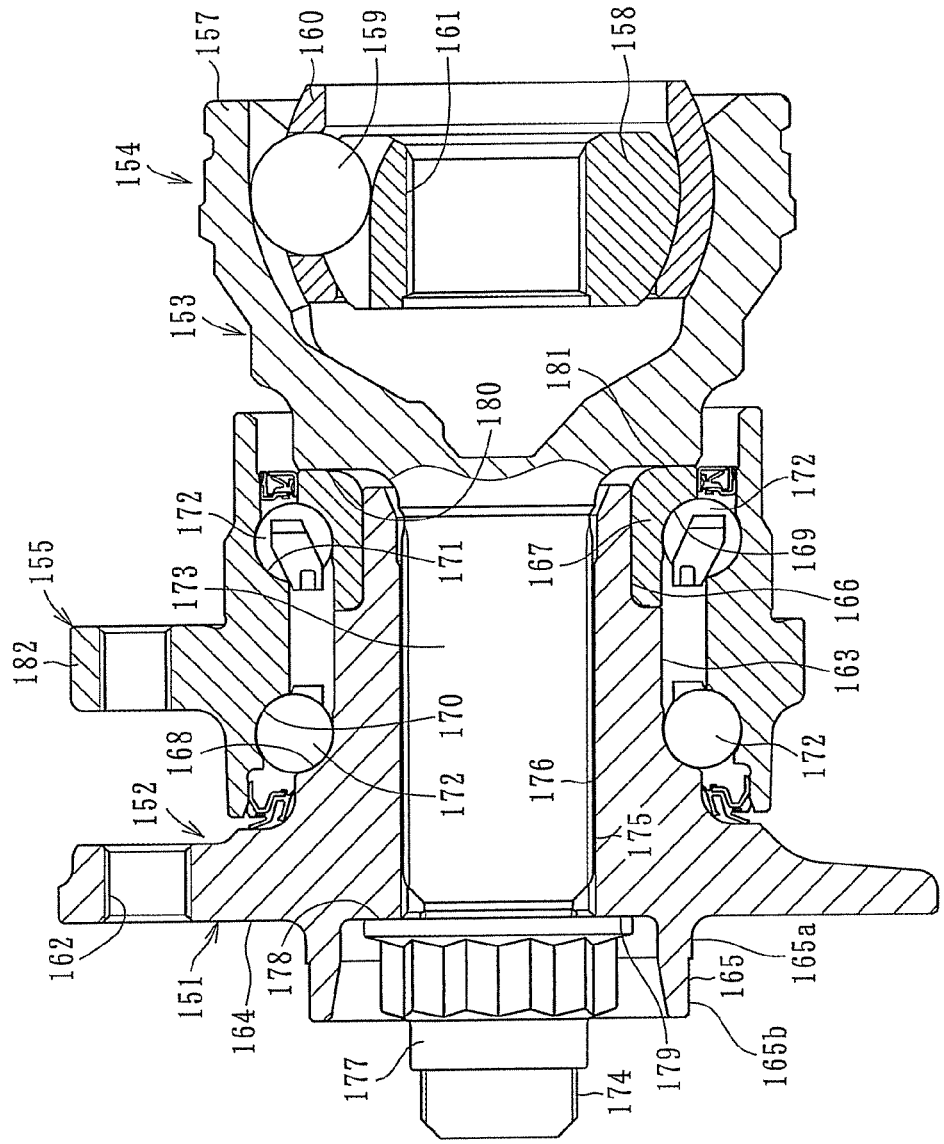
FIG. 40 is a sectional view of a conventional bearing device for a wheel.

As is apparent from FIGS. 38 and 39, when Δd/2 h exceeds 0.86, the press-fit load abruptly increases, and the torsional strength is reduced. When Δd/2 h is 0.3 or less, the torsional strength is reduced. Thus, it is desirable that 0.3<Δd/2 h<0.86. If solely the press-fit load were to be taken into consideration, it would be desirable for Δd/2 h to be 0.3 or less. However, that would involve a reduction in torsional strength, and hence the range of 0.3 or less should be avoided. Further, as is apparent from FIG. 42, also regarding the formability of the recess/projection fit-engagement structure M, it was satisfactory when Δd/2 h was in the range of 0.28 to 0.86. In contrast, in the examples in which Δd/2 h was 0.89 or 0.95, which is in excess of 0.86, the formability was deteriorated. In this case, the term deterioration means a fit-engagement structure that fails to provide the following effect: "due to the close contact of the projections and the recesses over the entire fit-engagement contact region, there is generated no play in the radial direction or the circumferential direction."

The invention claimed is:

1. A bearing device for a wheel, the bearing device comprising:
    an outer member having double-row outer raceway surfaces;
    an inner member having double-row inner raceway surfaces;
    a plurality of rolling elements in double rows interposed between the double-row outer raceway surfaces of the outer member and the double-row inner raceway surfaces of the inner member; and
    an outer joint member having a shaft section formed therein,
    wherein the inner member has a hub wheel having a hole and a flange for attachment to a wheel,
    wherein the shaft section of the outer joint member is inserted in a fitting manner into the hole of the hub wheel so that the shaft section is coupled to the hub wheel,
    wherein a plurality of axially extending projections provided on an outer diameter surface of the shaft section of the outer joint member are press-fitted along an axial direction into a plurality of small recesses provided on an inner diameter surface of the hole of the hub wheel, and a plurality of recesses, each having a volume that is larger than that of the small recesses, are formed in the hole of the hub wheel, at locations where the plurality of small recesses were previously provided, by cuts caused by the press-fitting of the projections, to thereby form a recess-projection fitting structure in which the projections and the recesses are held in close contact with each other over an entire region of fitting contact regions therebetween,
    wherein, in a pitch circle of the projections, an angle θ2 made by a radial line and a side surface of one of the projections satisfies the following relationship: 0°<θ2<45°, and
    wherein, when a pitch circle diameter of the projections is PCD, a number of the projections is Z, and P=PCD/Z, P satisfies the following relationship: 0.30<P<1.0.

2. A bearing device for a wheel according to claim 1, wherein the angle θ2 is set in the following range: 20°<θ2<35°, and wherein a value of P is set in the following range: 0.33<P<0.7.

3. A bearing device for a wheel according to claim 1, wherein a press-fitting margin Δd of the projections with respect to the hub wheel and a height h of the projections are in the following relationship: 0.3<Δd/2 h<0.86.

4. A bearing device for a wheel according to claim 1, wherein a corner portion devoid of roundness and capable of cutting into the hub wheel is provided at an edge of a press-fitting start side end surface of each of the projections.

5. A bearing device for a wheel according to claim 4, wherein the corner portion devoid of roundness is formed in at least a region of the edge of the press-fitting start side end surface of each of the projections to be fit-engaged with one of the recesses.

6. A bearing device for a wheel according to claim 1, wherein a hardness of an end region including at least a press-fitting start side end surface of each of the projections is higher than that of an inner peripheral portion of the hole of the hub wheel.

7. A bearing device for a wheel according to claim 1, wherein the projections are provided at a plurality of circumferential positions, and
    wherein, in middle portions in a height direction of the projections, circumferential thicknesses of the projections are smaller than widths of grooves between the adjacent projections.

8. A bearing device for a wheel according to claim 1, wherein the projections are provided at a plurality of circumferential positions, and
    wherein, in middle portions in a height direction of the projections, a sum total of circumferential thicknesses of the projections is smaller than a sum total of widths of grooves between the adjacent projections.

9. A bearing device for a wheel according to claim 1, wherein separation of the recess-projection fitting structure through imparting of an axial drawing force is allowed, and
    wherein the hub wheel and the shaft section of the outer joint member are fixed together through an intermediation of a bolt member.

10. A bearing device for a wheel according to claim 9, wherein an inner wall constituting a bearing surface of a head portion of the bolt member is provided in the hole of the hub wheel.

11. A bearing device for a wheel according to claim 1, wherein a pocket portion for accommodating protruding portions generated through formation of the recesses by the press-fitting is provided in the shaft section of the outer joint member.

12. A method of manufacturing a bearing device for a wheel, the bearing device comprising:
    an outer member having double-row outer raceway surfaces, an inner member having double-row inner raceway surfaces, rolling elements in double rows interposed between the double-row outer raceway surfaces of the outer member and the double-row inner raceway surfaces of the inner member, and an outer joint member having a shaft section formed therein,
    wherein the inner member has a hub wheel having a hole and a flange for attachment to a wheel,
    wherein the shaft section of the outer joint member is inserted in a fitting manner into the hole of the hub wheel so that the shaft section is coupled to the hub wheel,
    the method comprising the steps of:
    providing a plurality of axially extending projections on an outer diameter surface of the shaft section of the outer joint member so that in a pitch circle of the projections, an angle θ2 made by a radial line and a side surface of one of the projections satisfies the following relationship: $0° < \theta 2 < 45°$, and when a pitch circle diameter of the projections is PCD, a number of the projections is Z, and P=PCD/Z, P satisfies the following relationship: $0.30 < P < 1.0$;

press-fitting the projections along an axial direction into a plurality of small recesses provided on an inner diameter surface of the hole of the hub wheel; and forming a plurality of recesses, each having a volume that is larger than that of the small recesses, in the hole of the hub wheel by cuts caused by the press-fitting of the projections, to thereby form a recess-projection fitting structure in which the projections and the recesses are held in close contact with each other over an entire region of fitting contact regions therebetween.

* * * * *